(12) United States Patent
Segall et al.

(10) Patent No.: US 9,224,098 B2
(45) Date of Patent: Dec. 29, 2015

(54) SENSITIVITY ANALYSIS TOOL FOR MULTI-PARAMETER SELECTION

(71) Applicant: Optibrium Ltd, Cambridge (GB)

(72) Inventors: Matthew D. Segall, Ely (GB); Iskander Yusof, Cambridge (GB)

(73) Assignee: Optibrium Ltd., Cambridge (GB)

( * ) Notice: Subject to any disclaimer, the term of this patent is extended or adjusted under 35 U.S.C. 154(b) by 233 days.

(21) Appl. No.: 13/999,071

(22) Filed: Jan. 10, 2014

(65) Prior Publication Data
US 2015/0199612 A1  Jul. 16, 2015

(51) Int. Cl.
G06F 9/44 (2006.01)
G06N 7/02 (2006.01)
G06N 7/06 (2006.01)
G06N 7/00 (2006.01)
G06N 5/04 (2006.01)
G06Q 10/04 (2012.01)

(52) U.S. Cl.
CPC ............... *G06N 7/005* (2013.01); *G06N 5/04* (2013.01); *G06Q 10/04* (2013.01)

(58) Field of Classification Search
None
See application file for complete search history.

(56) References Cited

U.S. PATENT DOCUMENTS

2009/0265134 A1* 10/2009 Sambasivan ....... G05B 23/0297 702/179
2015/0185625 A1* 7/2015 Chen et al. .......... G03F 7/70633 702/182

OTHER PUBLICATIONS

Pusa, "Perturbation-Theory-Based Sensitivity and Uncertainty Analysis with CASMO-4", Science and Technology of Nuclear Installations, 2012, pp. 11.*
Beaudouin et al. "Selecting parameters for calibration via sensitivity analysis: An individual-based model of mosquitofish population dynamics", ecological modelling 218, 2008, pp. 29-48.*

* cited by examiner

*Primary Examiner* — Li-Wu Chang
(74) *Attorney, Agent, or Firm* — Wright IP & International Law; Eric G. Wright

(57) ABSTRACT

Methods, software, products and systems used to support decision making in complex multidimensional problem environments. Methods, software, products and systems to prioritize solutions for selection based upon selection criteria and available data regarding the possible solutions. The methods achieve a robust approach to determine the sensitivity of a selection to a multi-parameter profile of selection criteria and the importance of such criteria.

44 Claims, 16 Drawing Sheets

| | Value Sensitivity | Importance Sensitivity |
|---|---|---|
| 5HT1a affinity (pKi) | ▓▓▓▓▓▓▓▓▓▓ | 0.073618 |
| BBB log([brain]:[blood]) | 0.312261 | 0.0388615 |
| logP | 0.300766 | 0.136289 |
| hERG pIC50 | 0.0686918 | 0.14012 |
| logS | 0.134921 | 0.00109469 |
| 2D6 affinity category | N/A | 0.101533 |
| BBB category | N/A | 0.0889436 |
| PPB90 category | N/A | 0.0500821 |
| P-gp category | N/A | 0.028462 |
| 2C9 pKi | 0.00985222 | 0.00191571 |
| HIA category | N/A | 0 |

FIG. 7

SENSITIVITY ANALYSIS TOOL FOR MULTI-PARAMETER SELECTION

FIELD OF THE INVENTION

Computational tool for conducting sensitivity analysis for multi-parameter selection.

BACKGROUND OF THE INVENTION

Decision-makers are, more than ever before, faced with an overwhelming amount of information regarding the decisions which have to be made. If a decision is complex, decision-makers are often unable to understand how different selection criteria and characteristics of possible solutions compare to and affect one another, or how such selection criteria ultimately impact the decision which is made. When deciding between potential solutions, determining what factors to consider and what trade-offs can be acceptable between these factors can be extremely difficult, or not possible. Furthermore, having chosen a set of selection criteria, it is very difficult, or even not possible, to determine the impact of a specific choice of selection criteria on the results of a decision which is made. These problems are further compounded when there are uncertainties in the underlying information by which the options are assessed against the selection criteria. It is difficult, or not possible, to determine the sensitivity of the ultimate decision to the specific selection criteria defined in the profile, particularly when a decision-maker is faced with uncertain information regarding potential choices or solutions. A great need exists to solve these problems affecting decision-makers.

SUMMARY OF THE INVENTION

In an embodiment, a method can be executed on a computer to conduct an analysis of data which can have the steps of: providing a computer having a memory and a processing unit adapted to run computer readable program code means; providing to the memory an original selection profile having at least one selection criteria for at least one property in which an item has the at least one property; and providing to the memory a data from a data set having the item, the data having at least one property value of the at least one property of the item and an at least one uncertainty value for the at least one property value of the item; in which the item has at least one score and also in which each of the at least one score has an uncertainty. The computer can run a computer readable program code means processing the original selection profile and processing the data and calculating an original score for the item and an original uncertainty in each original score. Further, the computer can process a criterion of the selection criteria of the original selection profile using the following steps: (a) the computer executing a computer readable program code means calculating a sensitivity of the criterion resulting from a perturbation of the criterion by executing the steps of (i) running a computer readable program code means to generate a new selection profile resulting from a perturbation of the criterion in the original selection profile; (ii) running a computer readable program code means processing the new selection profile and processing the data and calculating a new score for the item and a new uncertainty in the new score; (iii) running a computer readable program code means processing the original score and new score for the item and processing the original uncertainty in the original score and new uncertainty in the new score in calculating a sensitivity value for the perturbation to the criterion; and (b) the computer running a computer readable program code means repeating steps (i), (ii) and (iii) for one or a plurality of the perturbation of the criterion; and (c) the computer running a computer readable program code means to calculate a sensitivity value for the criterion. The computer can run a computer readable program code means repeating steps (a), (b) and (c) for at least a second criterion in the selection profile different from the criterion. The computer can also provide an output having at least one of the sensitivity value for the criterion or the sensitivity value for the second criterion. In an embodiment, the original selection profile can be a multi-dimensional desirability function. Herein, the terms "step" and "method step" are used synonymously in the context of the steps of the embodiments of the disclosed methods.

In an embodiment, the step of providing to the memory an original selection profile, can further have the step of providing an importance value for at least one of the selection criteria in the original scoring profile and further have the steps for processing an importance value of a criterion of the selection criteria in the original selection profile of: (d) the computer executing a computer readable program code means calculating a sensitivity of the importance value of the criterion resulting from a perturbation of the importance value of the criterion by executing the steps of (iv) running a computer readable program code means to generate a new selection profile resulting from a perturbation of the importance value of the criterion in the original selection profile; (v) running a computer readable program code means processing the new selection profile and processing the data and calculating a new score for the item and a new uncertainty in the new score; and (vi) running a computer readable program code means processing the original score and new score for the item and processing the original uncertainty in the original score and the new uncertainty in the new score in calculating a sensitivity value for the perturbation to the importance value of the criterion; (e) the computer running a computer readable program code means repeating steps (iv), (v) and (vi) for one or a plurality of the perturbation of the importance value and (f) the computer running a computer readable program code means to calculate a sensitivity value for the importance value. Further, the computer can run a computer readable program code means repeating steps (d), (e) and (f) for at least a second importance value in the selection profile different from the importance value; and the computer providing an output having at least one of the sensitivity value for the importance value, or the sensitivity value for the second importance value.

In an embodiment, a method can be executed on a computer to conduct an analysis of data which can have the steps of: providing a computer having a memory and a processing unit adapted to run computer readable program code means; providing to the memory an original selection profile having at least one selection criteria for at least one property in which each respective item of a plurality of items has the at least one property; and providing to the memory a data from a data set having the plurality of items, the data having at least one property value of the at least one property for at least one item of the plurality of items and an at least one uncertainty value for the at least one property value of at least one item of the plurality of items in which each respective item of the plurality of items has at least one score and also in which each of the at least one score has an uncertainty. The computer can run a computer readable program code means processing the original selection profile and processing the data and calculating an original score for each respective item of the plurality of items and an original uncertainty in each original score. Further, the computer can process a criterion of the selection criteria of the original selection profile using the following steps: (a) the computer executing a computer readable program code means calculating a sensitivity of the criterion resulting from a perturbation of the criterion by executing the steps of (i) running a computer readable program code means to generate a new selection profile resulting from a perturbation of the criterion in the original selection profile; (ii) running a computer readable program code means processing the new selection profile and processing the data and calculating a new score for each respective item of the plurality of items and a new uncertainty in each new score; (iii) running a computer readable program code means processing the original scores and new scores for the plurality of items and processing the original uncertainties in the original scores and new uncertainties in the new scores in calculating a sensitivity value for the perturbation to the criterion; and (b) the computer running a computer readable program code means repeating steps (i), (ii) and (iii) for one or a plurality of the perturbation of the criterion; and (c) the computer running a computer readable program code means to calculate a sensitivity value for the criterion. The computer can run a computer readable program code means repeating steps (a), (b) and (c) for at least a second criterion in the selection profile different from the criterion. The computer can also provide an output having at least one of the sensitivity value for the criterion or the sensitivity value for the second criterion. In an embodiment, the original selection profile can be a multi-dimensional desirability function.

In an embodiment the method can process data for a plurality of items. There is no limit to the number of criteria, selection criterion or items which can be analysed by the methods disclosed herein. There is also no limit to the number of items which can be processed and no limit to the number of iterations which can be executed of the steps, method steps and/or methods disclosed herein.

In an embodiment, the step of providing to the memory an original selection profile, can further have the step of providing an importance value for at least one selection criteria in the original scoring profile and further have the steps for processing an importance value of a criterion of the selection criteria in the original selection profile: (d) the computer executing a computer readable program code means calculating a sensitivity of the importance value of the criterion resulting from a perturbation of the importance value of the criterion by executing the steps of (iv) running a computer readable program code means to generate a new selection profile resulting from a perturbation of the importance value of the criterion in the original selection profile; (v) running a computer readable program code means processing the new selection profile and processing the data and calculating a new score for each respective item of the plurality of items and a new uncertainty in each new score; and (vi) running a computer readable program code means processing the original scores and new scores for the plurality of items and processing the original uncertainties in the original scores and the new uncertainties in the new scores in calculating a sensitivity value for the perturbation to the importance value of the criterion; (e) the computer running a computer readable program code means repeating steps (iv), (v) and (vi) for one or a plurality of the perturbation of the importance value and (f) the computer running a computer readable program code means to calculate a sensitivity value for the importance value. Further, the computer can run a computer readable program code means repeating steps (d), (e) and (f) for at least a second importance value in the selection profile different from the importance value; and the computer providing an output having at least one of the sensitivity value for the importance value, or the sensitivity value for the second importance value.

The embodiments disclosed herein can have one or more original selection profiles or new selection profiles each of which can optionally be defined as a multi-dimensional desirability function. There is no limit to the number desirability functions used and no limit to the variables and/or dimensions which can be used.

In embodiments, a selection profile can be defined as a multi-dimensional desirability function having:

$$D(x_1, x_2, \ldots, x_M \mid d_1(x_1), d_2(x_2), \ldots, d_M(x_M), c_1, c_2, \ldots, c_M) = \sum_{i=1}^{M} c_i d_i(x_i)$$

In embodiments, a selection profile can be defined as a multi-dimensional desirability function having:

$$D(x_1, x_2, \ldots, x_M \mid d_1(x_1), d_2(x_2), \ldots, d_M(x_M), c_1, c_2, \ldots, c_M) = \frac{1}{\sum_{i=1}^{M} c_i} \sum_{i=1}^{M} c_i d_i(x_i)$$

In embodiments, a selection profile can be defined as a multi-dimensional desirability function having:

$$D(x_1, x_2, \ldots, x_M \mid d_1(x_1), d_2(x_2), \ldots, d_M(x_M), c_1, c_2, \ldots, c_M) = \prod_{i=1}^{M} d_i(x_i)^{c_i}$$

In embodiments, a selection profile can be defined as a multi-dimensional desirability function having:

$$D(x_1, x_2, \ldots, x_M \mid d_1(x_1), d_2(x_2), \ldots, d_M(x_M), c_1, c_2, \ldots, c_M) = \sqrt[\sum_{i=1}^{M} c_i]{\prod_{i=1}^{M} d_i(x_i)^{c_i}}$$

The embodiments disclosed herein can further have the optional step of receiving an input in the computer memory specifying a proportion of the data set to be selected, K, and in which the sensitivity of the criterion resulting from a perturbation is calculated as:

$$1 - r(\{s_j\}, \{s'_j\})$$

in which r is the correlation coefficient of the original scores, $s_j$, new scores, $s'_j$, of a subset of K items in the data set, such as in non-limiting example items meeting a desired score, range of scores, having a score which is related to other scores in a desired fashion, such as higher than, lower than, equal to, lowest or highest. The subset of one or more K items can be a number of items which are desirably comparable to other items such as a group having higher or highest scores as compared to other items, or a group having lower or lowest scores as compared to other items, or one or a group of K items meeting a desired requirement or score value or range. Here K can take any value from 1 to the total number of items in the data set.

The embodiments disclosed herein can further have the optional step of receiving an input in the computer memory specifying a proportion of the data set to be selected, K, and in which the sensitivity of the criterion resulting from a perturbation is calculated as:

$$1-\rho(\{r_j\},\{r'_j\})$$

in which $\rho$ is the Spearman's rank correlation coefficient of the original ranks, $r_j$, and new ranks, $r_j'$, of the subset of K items in the data set. Here K can take any value from 1 to the total number of items in the data set, for example 10%, 20%, 30%, 40%, 50% 75% or 100% of the total number of items.

Optionally, the embodiments disclosed herein can further have the step of receiving an input in the computer memory specifying a level of significance and the optional step of receiving an input in the computer memory specifying a proportion of the data set to be selected, K, and in which the sensitivity of the criterion resulting from a perturbation is calculated as:

$$1-\rho(\{r_j\},\{r'_j\})$$

in which $\rho$ is the Spearman's rank correlation coefficient, modified to reflect when the perturbation results in a statistically significant change in the item scores, of the original ranks, $r_j$, and new ranks, $r_j'$, of the subset of K items in the data set. Here K can take any value from 1 to the total number of items in the data set, for example 10%, 20%, 30%, 40%, 50% 75% or 100% of the total number of items. The number of items which can be used is without limit.

In an embodiment, the original score and new score for the item can be calculated by processing the expected value of the multi-dimensional desirability function.

In embodiments, the probability distribution for the original score and new score for one or a number of the item can be assumed to be normally distributed with a mean resulting from processing the expected value of the multi-dimensional desirability function and variance resulting from processing the variance of the multi-dimensional desirability function.

In embodiments, the perturbation to the criterion of a property in the selection profile is a rigid shift, $\Delta x_k$, of the desirability function of the criterion for the property and the new selection profile is the multi-dimensional desirability function:

$$D(x_1,x_2,\ldots,x_M|d_1(x_1),d_2(x_2),\ldots d_k(x_k+\Delta x_k),\ldots,d_M(x_M),c_1,c_2,\ldots,c_M)$$

in which D is the multi-dimensional desirability function defining to the original selection profile.

In another embodiment, the methods disclosed herein can have the optional step of receiving an input in the computer memory specifying a fraction $f_s$ that can take any value greater than 0, for example a value in the range 0 to 1, and in which the rigid shift, $\Delta x_k$, of the desirability function can have:

$$\Delta x_{kh} = \pm\left(\frac{(h-1)}{H} - 1\right)f_s(\max(x_{kj}) - \min(x_{kj}))$$

in which k is the property perturbed in the new selection profile, h is an integer in the range $1 \leq h \leq H$ and H can take any value greater than or equal to 1, for example 5, 10, 20, 100, 1000 or greater.

In another embodiment, the methods disclosed herein can optionally have a step (d) of the computer executing a computer readable program code means calculating a sensitivity of the criterion resulting from a perturbation of the importance value of a criterion in which the perturbation of the importance value of the criterion is a shift in importance, $\Delta x_k$, in a coefficient defining the importance of the criterion for the property and the new selection profile is a multi-dimensional desirability function having:

$$D(x_{1j},x_{2j},\ldots,x_M|d_1(x_1),d_2(x_2),\ldots,d_M(x_M),c_1,c_2,\ldots,c_k+\Delta c_k,\ldots,c_M).$$

in which D is the multi-dimensional desirability function defining to the original selection profile.

In another embodiment, the methods disclosed herein can optionally have a step of receiving an input in the computer memory specifying a fraction $f_c$ that can take any value greater than 0, for example in the range 0 to 1, and in which the shift of the importance, $\Delta c_k$, of the property in the desirability function can have:

$$\Delta c_{kh} = \pm\left(\frac{(h-1)}{H} - 1\right)f_c c_k$$

in which h is an integer in the range $1 \leq h \leq H$ and H can take any value greater than or equal to 1, for example 5, 10, 20, 100, 1000 or greater.

In another embodiment, the methods disclosed herein can optionally have a step (d) of the computer executing a computer readable program code means calculating a sensitivity of the criterion resulting from a perturbation of the importance value of a criterion in which the perturbation of the importance value of the criterion is a perturbation, $\Delta d_k$, of the desirability function of the criterion for the property and the new selection profile is a multi-dimensional desirability function having:

$$D(x_{1j},x_{2j},\ldots,x_M|d_1(x_1),d_2(x_2),\ldots,d'_k(x_k),\ldots,d_M(x_M))$$

in which D is the multi-dimensional desirability function defining to the original selection profile and $$d'_k(x_k) = (d_k(x_k) - \min(d_k(x)))\left(1 - \frac{\Delta d_k}{\max(d_k(x)) - \min(d_k(x))}\right) + \Delta d_k + \min(d_k(x))$$

In another embodiment, a further optional step can be used in which receiving an input in the computer memory specifying a fraction $f_d$ that can take any value greater than 0 in which the perturbation, $\Delta d_k$, of the desirability function of the criterion can have:

$$\Delta d_{kh} = \pm\left(\frac{(h-1)}{H} - 1\right)f_d \max(d_k(x))$$

in which h is an integer in the range $1 \leq h \leq H$ and H can take any value greater than or equal to 1.

In a further embodiment, an optional step can be used of receiving an input in the computer memory specifying a fraction $f_s$ that can take any value greater than 0 and in which in step (a) of the computer executing a computer readable program code means calculating a sensitivity of the criterion resulting from a perturbation of a criterion in which the perturbation to the criterion of the property in the selection profile is a rigid shift, $\Delta x_k$, of the desirability function of the criterion for the property having:

$$\Delta x_{kh} = \pm\left(\frac{(h-1)}{H} - 1\right)f_s(\max(x_{kj}) - \min(x_{kj}))$$

in which k is the property perturbed in the new selection profile, h is an integer in the range $1 \le h \le H$ and H can take any value greater than or equal to 1, for example 5, 10, 20, 100, 1000 or greater. And the new selection profile is the multi-dimensional desirability function $$D(x_1, x_2, \ldots, x_M | d_1(x_1), d_2(x_2), \ldots d_k(x_k + \Delta x_k), \ldots, d_M(x_M), c_1, c_2, \ldots, c_M)$$

in which D is the multi-dimensional desirability function defining to the original selection profile.

In an embodiment, the probability distribution for the original score and new score for the item can be assumed to be normally distributed with mean resulting from processing the expected value of the multi-dimensional desirability function and variance resulting from processing the variance of the multi-dimensional desirability function.

In embodiments, an optional step can be used of receiving an input in the computer memory specifying a fraction $f_d$ that can take any value greater than 0 and in which in step (d) of the computer executing a computer readable program code means calculating a sensitivity of the criterion resulting from a perturbation of the importance value of a criterion in which the perturbation of the importance value of the criterion is a perturbation, $\Delta d_k$, having:

$$\Delta d_{kh} = \pm\left(\frac{(h-1)}{H} - 1\right)f_d \max(d_k(x))$$

in which h is an integer in the range $1 \le h \le H$ and H can take any value greater than or equal to 1 and the new selection profile is a multi-dimensional desirability function having:

$$D(x_{1j}, x_{2j}, \ldots, x_M | d_1(x_1), d_2(x_2), \ldots, d'_k(x_k), \ldots, d_M(x_M))$$

in which D is the multi-dimensional desirability function defining to the original selection profile and $$d'_k(x_k) = (d_k(x_k) - \min(d_k(x)))\left(1 - \frac{\Delta d_{kh}}{\max(d_k(x)) - \min(d_k(x))}\right) + \Delta d_{kh} + \min(d_k(x))$$

In an embodiment, the computer can output the sensitivities of one or more individual perturbations to one or more parameters of the selection profile.

In an embodiment, the computer can output the impact of one or more individual perturbations to one or more parameters on the scores of the items in the data set.

In an embodiment, the plurality of items can be one or a plurality of compounds, candidate drugs, pharmaceuticals or any compound, molecule, ion, inorganic compound, structure and/or element. The importance value can be an importance value of one or a plurality of compounds, candidate drugs, pharmaceuticals or any compound, molecule, ion, inorganic compound, structure and/or element.

The scope of this disclosure encompasses the methods and means to achieve the disclosed data analysis, as well as encompassing any article, product, means, and methods for producing and using any software, application, computer executable code, programming, logical sequences, or other form of electronic or automated means to achieve and/or use the methods herein or numerical analysis disclosed. Such products, articles and means include for example, but are not limited to, a software application product provided on a fixed media, such as a disk, or in a physical memory, or in a memory stick, or as a software application product, or as an application provided by digital download, or provided by other means. This application expressly encompasses installed, uninstalled, compiled and not compiled versions of any software product or equivalent product capable of being used, implemented, installed or otherwise made active to use, achieve and/or practice the methods disclosed herein. In addition to its normal and customary meanings, the recitation "computer readable program code means" is intended to be broadly construed to encompass any kind and type of computer readable program code, executable code, software as a service, web service, embedded application, software application product provided on a fixed media, such as a disk, or in a physical memory, or in flash memory, or in a memory stick, or as a software application product, or as an application provided by digital download, or encoded on programmable hardware, or provided by other means which can be employed to make, use, sell, practice, achieve, engage in, produce, function or operate the methods disclosed herein. The application is to be broadly construed in this regard and not limited to any means of delivery or to any product form for providing or using, achieving and/or practicing the computer readable program code products, means and/or methods disclosed herein. In embodiments, all of the methods herein can be produced and provided to a user as a software product(s), software application(s), computer readable program code means(s) or any other article(s) or device(s) which can be used to achieve any, some or all of the results, calculations and/or numerical methods disclosed herein.

In an embodiment, a product is disclosed which is a computer program product for an analysis of data, having: a computer readable program code means which provides to a computer memory an original selection profile having at least one selection criteria for an at least one property, in which an item has the at least one property; a computer readable program code means which provides to the memory a data from a data set having the item, the data having at least one property value of the at least one property of the item and an at least one uncertainty value for the at least one property value of the item, in which the item has at least one score, and in which each of the at least one score has an uncertainty; and a computer readable program code means which processes the original selection profile and processes the data set and is adapted to calculate an original score for the item and an original uncertainty in the original score. Further, the product can have a computer readable program code means which processes a criterion of the selection criteria of the original selection profile which has: (a) a computer readable program code means which calculates a sensitivity of the criterion resulting from a perturbation of the criterion which has (i) a computer readable program code means which generates a new selection profile resulting from a perturbation of the criterion in the original selection profile; (ii) a computer readable program code means which processes the new selection profile and processes the data set and which is adapted to calculate a new score for the item and a new uncertainty in new score; and (iii) a computer readable program code means which processes the original score and new score for the item and processes the original uncertainty in the original score and new uncertainty in the new score and is adapted to calculate a sensitivity value for the perturbation to the criterion; (b) a computer readable program code means which is adapted to execute the computer readable program code means (i), (ii) and (iii) for one or a plurality of the perturbation of the criterion; and (c) a computer readable program code means which is adapted to calculate a sensitivity value for the criterion. Further, the product can have a computer readable program code means adapted to execute the computer readable program code means (a), (b) and (c) for at least a second criterion in the selection profile different from the criterion. The product can also have a computer readable program code means adapted to provide an output having at least one of the sensitivity value for the criterion or the sensitivity value for the second criterion. In an embodiment, the product can use an original selection profile which is a multi-dimensional desirability function.

In an embodiment the product can also have a computer readable program code means which provides an importance value for at least one selection criteria in the original scoring profile; and can have a computer readable program code means adapted to process the importance value of a criterion of the selection criteria in the original selection profile by computer readable program code means additionally having: (d) a computer readable program code means which calculates a sensitivity of the importance value of the criterion resulting from a perturbation of the importance value of the criterion by executing the steps of (iv) a computer readable program code means which can generate a new selection profile resulting from a perturbation of the importance value of the criterion in the original selection profile; (v) a computer readable program code means which can process the new selection profile and which is adapted to process the data set and to calculate a new score for the item and to calculate a new uncertainty in the new score; and (vi) a computer readable program code means which can process the original score and the new score for the item and which is adapted to process the original uncertainty in the original score and the new uncertainty in the new score to calculate a sensitivity value for the perturbation to the importance value of the criterion; (e) a computer readable program code means adapted to execute the computer readable program code means of (iv), (v) and (vi) for one or a plurality of the perturbation of the importance value; and (f) a computer readable program code means which is adapted to calculate a sensitivity value for the importance value. Further, the product can have a computer readable program code means which is adapted to repeat the calculations of (d), (e) and (f) for at least a second importance value in the selection profile different from the importance value. The product can also have a computer readable program code means which is adapted to provide an output having at least one of the sensitivity value for the importance value, or the sensitivity value for the second importance value.

In an embodiment, a product is disclosed which is a computer program product for an analysis of data, having: a computer readable program code means which provides to a computer memory an original selection profile having at least one selection criteria for an at least one property, in which each respective item of a plurality of items has the at least one property; a computer readable program code means which provides to the memory a data from a data set having the plurality of items, the data having at least one property value of the at least one property for at least one item of the plurality of items and an at least one uncertainty value for the at least one property value of at least one item of the plurality of items; in which each respective item of the plurality of items has at least one score, and in which each of the at least one score has an uncertainty; and a computer readable program code means which processes the original selection profile and processes the data set and is adapted to calculate an original score for each respective item of the plurality of items and an original uncertainty in each original score. Further, the product can have a computer readable program code means which processes a criterion of the selection criteria of the original selection profile which has: (a) a computer readable program code means which calculates a sensitivity of the criterion resulting from a perturbation of the criterion which has (i) a computer readable program code means which generates a new selection profile resulting from a perturbation of the criterion in the original selection profile; (ii) a computer readable program code means which processes the new selection profile and processes the data set and which is adapted to calculate a new score for each respective item of the plurality of items and a new uncertainty in each new score; and (iii) a computer readable program code means which processes the original scores and new scores for the plurality of items and processes the original uncertainties in the original scores and new uncertainties in the new scores and is adapted to calculate a sensitivity value for the perturbation to the criterion; (b) a computer readable program code means which is adapted to execute the computer readable program code means (i), (ii) and (iii) for one or a plurality of the perturbation of the criterion; and (c) a computer readable program code means which is adapted to calculate a sensitivity value for the criterion. Further, the product can have a computer readable program code means adapted to execute the computer readable program code means (a), (b) and (c) for at least a second criterion in the selection profile different from the criterion. The product can also have a computer readable program code means adapted to provide an output having at least one of the sensitivity value for the criterion or the sensitivity value for the second criterion. In an embodiment, the product can use an original selection profile which is a multi-dimensional desirability function.

In an embodiment the product can also have a computer readable program code means which provides an importance value for at least one selection criteria in the original scoring profile; and can have a computer readable program code means adapted to process the importance value of a criterion of the selection criteria in the original selection profile by computer readable program code means having: (d) a computer readable program code means which calculates a sensitivity of the importance value of the criterion resulting from a perturbation of the importance value of the criterion by executing the steps of: (iv) a computer readable program code means which can generate a new selection profile resulting from a perturbation of the importance value of the criterion in the original selection profile; (v) a computer readable program code means which can process the new selection profile and which is adapted to process the data set and to calculate a new score for each respective item of the plurality of items and to calculate a new uncertainty in each new score; and (vi) a computer readable program code means which can process the original scores and the new scores for the plurality of items and which is adapted to process the original uncertainties in the original scores and to process the new uncertainties in the new scores to calculate a sensitivity value for the perturbation to the importance value of the criterion; (e) a computer readable program code means adapted to execute the computer readable program code means of (iv), (v) and (vi) for one or a plurality of the perturbation of the importance value; and (f) a computer readable program code means which is adapted to calculate a sensitivity value for the importance value. Further, the product can have a computer readable program code means which is adapted to repeat the calculations of (d), (e) and (f) for at least a second importance value in the selection profile different from the importance value. The product can also have a computer readable program code means which is adapted to provide an output having at least one of the sensitivity value for the importance value, or the sensitivity value for the second importance value.

The product embodiments disclosed herein can have one or more original selection profiles or new selection profiles each of which can optionally be a multi-dimensional desirability function. There is no limit to the number of desirability functions used and no limit to the variables and/or dimensions which can be used.

The product embodiments disclosed herein can have a selection profile which is a multi-dimensional desirability function having:

$$D(x_1, x_2, \ldots, x_M \mid d_1(x_1), d_2(x_2), \ldots, d_M(x_M), c_1, c_2, \ldots, c_M) = \prod_{i=1}^{M} d_i(x_i)^{c_i}$$

The product embodiments disclosed herein can have a selection profile which is a multi-dimensional desirability function having:

$$D(x_1, x_2, \ldots, x_M \mid d_1(x_1), d_2(x_2), \ldots, d_M(x_M), c_1, c_2, \ldots, c_M) = \prod_{i=1}^{M} d_i(x_i)^{c_i}$$

In embodiments, the product can optionally have computer readable program code means which can receive an input in the computer memory specifying a level of significance and which can receive an input in the computer memory specifying a proportion of the data set to be selected, K, and in which the sensitivity of the criterion resulting from a perturbation is calculated as $$1 - \rho(\{r_j\}, \{r_j'\})$$

in which $\rho$ is the Spearman's rank correlation coefficient, modified to reflect when the perturbation results in a statistically significant change in the item scores, of the original ranks, $r_j$, and new ranks, $r_j'$, of the subset of K items in the data set. Here K can take any value from 1 to the total number of items in the data set.

In embodiments, the product can optionally have computer readable program code means which can receive an input in the computer memory specifying a level of significance and which can receive an input in the computer memory specifying a proportion of the data set to be selected, K, and in which the sensitivity of the criterion resulting from a perturbation is calculated as $$1 - \rho(\{r_j\}, \{r_j'\})$$

in which $\rho$ is the Spearman's rank correlation coefficient, modified to reflect when the perturbation results in a statistically significant change in the item scores, of the original ranks, $r_j$, and new ranks, $r_j'$, of the subset of K items in the data set. Here K can take any value from 1 to the total number of items in the data set.

In an embodiment, the product can have computer readable program code means which can process data on a basis in which the probability distribution for the original score and new score for the item can be assumed to be normally distributed with mean resulting from processing the expected value of the multi-dimensional desirability function and variance resulting from processing the variance of the multi-dimensional desirability function.

In an embodiment, the product can have computer readable program code means which can process data on a basis in which the probability distribution for the original score and new score for the item can be assumed to be normally distributed with mean resulting from processing the expected value of the multi-dimensional desirability function and variance resulting from processing the variance of the multi-dimensional desirability function.

In an embodiment, the product can have computer readable program code means in which (a) the perturbation to the criterion of the property in the selection profile is a rigid shift, $\Delta x_k$, of the desirability function of the criterion for the property and the new selection profile is the multi-dimensional desirability function $$D(x_1, x_2, \ldots, x_M \mid d_1(x_1), d_2(x_2), \ldots d_k(x_k + \Delta x_k), \ldots, d_M(x_M), c_1, c_2, \ldots, c_M)$$

in which D is the multi-dimensional desirability function defining the original selection profile.

In an embodiment, the product can have computer readable program code means in which (d) the perturbation of the importance value of the criterion is a shift in importance, $\Delta c_k$, in a coefficient defining the importance of the criterion for the property and the new selection profile is a multi-dimensional desirability function of the form $$D(x_{1j}, x_{2j}, \ldots, x_M \mid d_1(x_1), d_2(x_2), \ldots, d_M(x_M), c_1, c_2, \ldots, c_k + \Delta c_k, \ldots, c_M)$$

in which D is the multi-dimensional desirability function defining the original selection profile.

In an embodiment, the product can have computer readable program code means in which in (d) the perturbation of the importance value of the criterion is a perturbation, $\Delta d_k$, of the desirability function of the criterion for the property and the new selection profile is a multi-dimensional desirability function having:

$$D(x_{1j}, x_{2j}, \ldots, x_M \mid d_1(x_1), d_2(x_2), \ldots, d'_k(x_k), \ldots, d_M(x_M))$$

in which D is the multi-dimensional desirability function defining to the original selection profile and $$d'_k(x_k) = (d_k(x_k) - \min(d_k(x))) \left(1 - \frac{\Delta d_k}{\max(d_k(x)) - \min(d_k(x))}\right) + \Delta d_k + \min(d_k(x))$$

In an embodiment, the plurality of items for which data is provided to the computer readable program code can be one or a plurality of compounds, candidate drugs, pharmaceuticals or any compound, molecule, ion, organic compound, inorganic compound, structure and/or element. The criteria and importance values provided to the computer readable program code can be criteria and importance values of one or a plurality of general, biological, chemical or physicochemical properties of compounds, candidate drugs, pharmaceuticals or any compound, molecule, ion, inorganic compound, structure and/or element.

In an embodiment, a method can be executed on a computer for an analysis of data, having the steps of: providing a computer having a memory and a processing unit adapted to run computer readable program code means; providing to the memory an original selection profile having at least one selection criteria for at least one property; in which a compound has the at least one property; and providing to the memory a data from a data set having the compound, the data having at least one property value of the at least one property of the compound and an at least one uncertainty value for the at least one property value of the compound; in which the compound has at least one score, and also in which each of the at least one score has an uncertainty. The computer can run a computer readable program code means processing the original selection profile and processing the data and calculating an original score for the compound and an original uncertainty in the original score; and the computer can process a criterion of the selection criteria of the original selection profile using the steps: (A) the computer executing a computer readable program code means calculating a sensitivity of the criterion resulting from a perturbation of the criterion by executing the steps of (I) running a computer readable program code means to generate a new selection profile resulting from a perturbation of the criterion in the original selection profile; (II) running a computer readable program code means processing the new selection profile and processing the data and calculating a new score for the compound and a new uncertainty in the new score; and (III) running a computer readable program code means processing the original score and new score for the compound and processing the original uncertainty in the original score and new uncertainty in the new score in calculating a sensitivity value for the perturbation to the criterion; (B) the computer running a computer readable program code means repeating steps (I), (II) and (III) for one or a plurality of the perturbation of the criterion; and (C) the computer running a computer readable program code means to calculate a sensitivity value for the criterion. Further, the computer can run a computer readable program code means repeating steps (A), (B) and (C) for at least a second criterion in the selection profile different from the criterion. The computer can also provide an output having at least one of the sensitivity value for the criterion or the sensitivity value for the second criterion.

In an embodiment, the method can have the step of providing to the memory an original selection profile having at least one selection criteria for an at least one property, and can have the further step of providing an importance value for at least one selection criteria in the original scoring profile and can further have the following steps for processing an importance value of a criterion of the selection criteria in the original selection profile of: (D) the computer executing a computer readable program code means calculating a sensitivity of the importance value of the criterion resulting from a perturbation of the importance value of the criterion by executing the steps of: (IV) running a computer readable program code means to generate a new selection profile resulting from a perturbation of the importance value of the criterion in the original selection profile; (V) running a computer readable program code means processing the new selection profile and processing the data and calculating a new score for the compound and a new uncertainty in the new score; and (VI) running a computer readable program code means processing the original score and new score for the compound and processing the original uncertainty in the original score and new uncertainty in the new score in calculating a sensitivity value for the perturbation to the importance value of the criterion; (E) the computer running a computer readable program code means repeating steps (IV), (V) and (VI) for one or a plurality of the perturbation of the importance value; and (F) the computer running a computer readable program code means to calculate a sensitivity value for the importance value. Further, the computer can run a computer readable program code means repeating steps (D), (E) and (F) for at least a second importance value in the selection profile different from the importance value. The computer can also provide an output having at least one of the sensitivity value for the importance value, or the sensitivity value for the second importance value.

In an embodiment, a method can be executed on a computer for an analysis of data, having the steps of: providing a computer having a memory and a processing unit adapted to run computer readable program code means; providing to the memory an original selection profile having at least one selection criteria for at least one property in which each respective compound of a plurality of compounds has the at least one property; and providing to the memory a data from a data set having the plurality of compounds, the data having at least one property value of the at least one property for at least one compound of the plurality of compounds and an at least one uncertainty value for the at least one property value of at least one compound of the plurality of compounds; in which each respective compound of the plurality of compounds has at least one score, and in which each of the at least one score has an uncertainty. The computer can run a computer readable program code means processing the original selection profile and processing the data and calculating an original score for each respective compound of the plurality of compounds and an original uncertainty in each original score; and the computer can process a criterion of the selection criteria of the original selection profile using the steps: (A) the computer executing a computer readable program code means calculating a sensitivity of the criterion resulting from a perturbation of the criterion by executing the steps of (I) running a computer readable program code means to generate a new selection profile resulting from a perturbation of the criterion in the original selection profile; (II) running a computer readable program code means processing the new selection profile and processing the data and calculating a new score for each respective compound of the plurality of compounds and a new uncertainty in each new score; and (III) running a computer readable program code means processing the original scores and new scores for the plurality of compounds and processing the original uncertainties in the original scores and new uncertainties in the new scores in calculating a sensitivity value for the perturbation to the criterion; (B) the computer running a computer readable program code means repeating steps (I), (II) and (III) for one or a plurality of the perturbation of the criterion; and (C) the computer running a computer readable program code means to calculate a sensitivity value for the criterion. Further, the computer can run a computer readable program code means repeating steps (A), (B) and (C) for at least a second criterion in the selection profile different from the criterion. The computer can also provide an output having at least one of the sensitivity value for the criterion or the sensitivity value for the second criterion.

In an embodiment, the method can have the step of providing to the memory an original selection profile having at least one selection criteria for an at least one property, and can have the further step of providing an importance value for at least one selection criteria in the original scoring profile and can further have the following steps for processing an importance value of a criterion of the selection criteria in the original selection profile: (D) the computer executing a computer readable program code means calculating a sensitivity of the importance value of the criterion resulting from a perturbation of the importance value of the criterion by executing the steps of: (IV) running a computer readable program code means to generate a new selection profile resulting from a perturbation of the importance value of the criterion in the original selection profile; (V) running a computer readable program code means processing the new selection profile and processing the data and calculating a new score for each respective item of the plurality of compounds and a new uncertainty in each new score; and (VI) running a computer readable program code means processing the original scores and new scores for the plurality of compounds and processing the original uncertainties in the original scores and new uncertainties in the new scores in calculating a sensitivity value for the perturbation to the importance value of the criterion, (E) the computer running a computer readable program code means repeating steps (IV), (V) and (VI) for one or a plurality of the perturbation of the importance value; and (F) the computer running a computer readable program code means to calculate a sensitivity value for the importance value. Further, the computer can run a computer readable program code means repeating steps (D), (E) and (F) for at least a second importance value in the selection profile different from the importance value. The computer can also provide an output having at least one of the sensitivity value for the importance value, or the sensitivity value for the second importance value.

In an embodiment, the plurality of items for which data is provided to the computer readable program code can be one or a plurality of compounds, candidate drugs, pharmaceuticals or any compound, molecule, ion, inorganic compound, structure and/or element. The criteria and importance values provided to the computer readable program code can be criteria and importance values of one or a plurality of general, biological, chemical or physicochemical properties of compounds, candidate drugs, pharmaceuticals or any compound, molecule, ion, inorganic compound, structure and/or element.

In an embodiment, the plurality of items for which data is provided to the computer readable program code can be one or a plurality of compounds, candidate drugs, pharmaceuticals, compositions, reactants, products, solvents, catalysts, active ingredients, or any compound, molecule, ion, inorganic compound, structure and/or element. Properties can be provided for one or a plurality of compounds, candidate drugs, pharmaceuticals, compositions, reactants, products, solvents, catalysts, active ingredients, or any compound, molecule, ion, inorganic compound, structure and/or element. The uncertainty value can be an uncertainty value for a property of one or a plurality of compounds, candidate drugs, pharmaceuticals, compositions, reactants, products, solvents, catalysts, active ingredients, or any compound, molecule, ion, inorganic compound, structure and/or element.

BRIEF DESCRIPTION OF THE DRAWINGS

The present invention in its several aspects and embodiments solves the problems discussed above and significantly advances the technology of numerical methods regarding decision making. The present invention can become more fully understood from the detailed description and the accompanying drawings, wherein:

FIG. 7 is an example of the output of numerical sensitivity values for a number of property criteria and their importance;

DETAILED DESCRIPTION OF THE INVENTION

Figure 1:
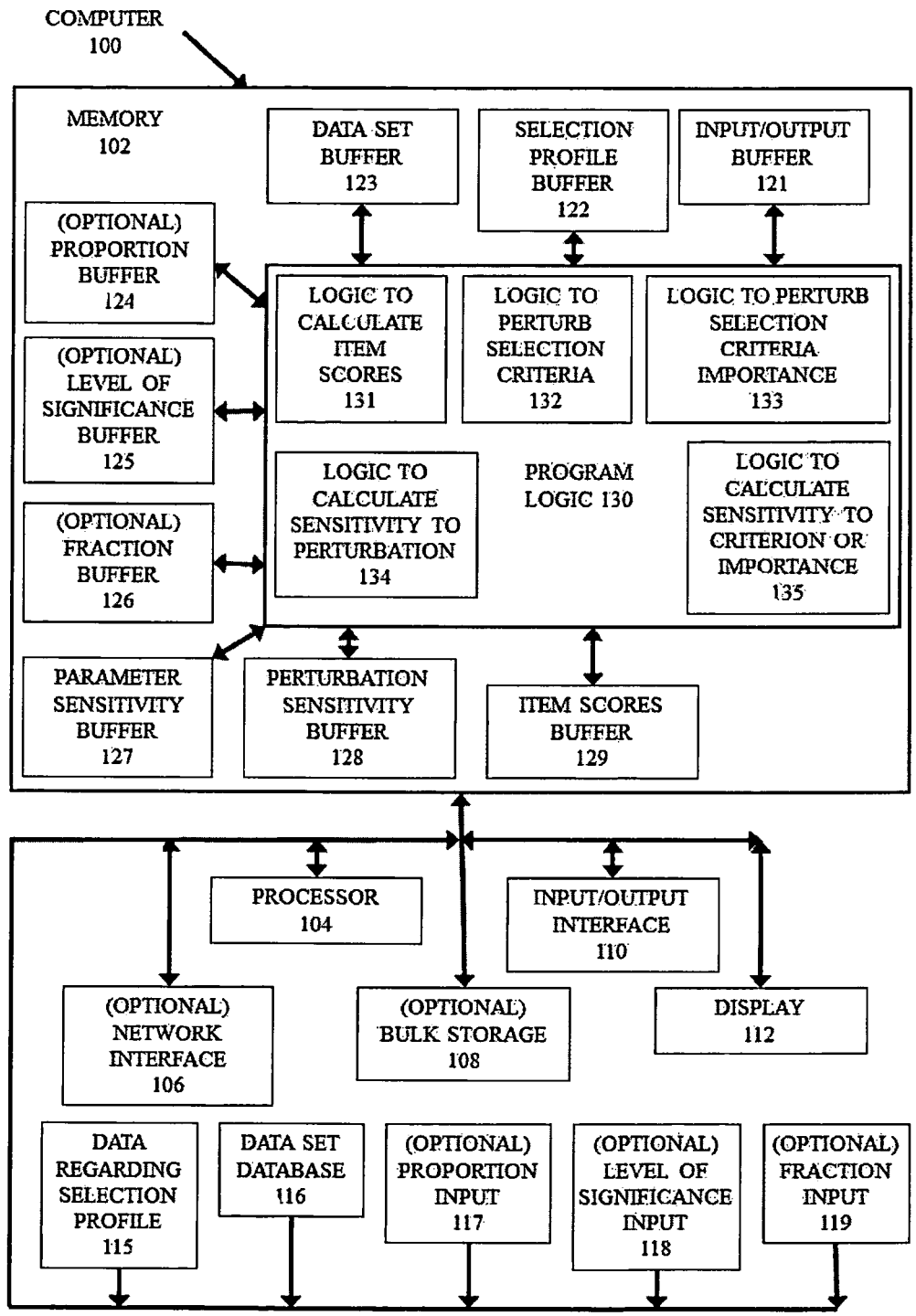
FIG. 1 is a functional block diagram of a computer system.

Decisions are commonly made based on consideration of multiple and sometimes conflicting factors. In the face of complex information, it is common to define a set of selection criteria, by which the options or possible solutions are refined and reduced until a small number remain. An analysis reducing options and/or solutions ("options" and "solutions" are used synonymously herein) can result in a single option, a small number of options or a larger number of possible solutions. The number of options which are analysed can depend on limitations of time and/or resources. Non-limiting examples of such decisions include decisions between different courses of action, purchasing decisions, investment decisions or resource allocation decisions. The disclosure herein in its many and various embodiments provides a rigorous decision analysis method to analyse the impact of a choice of selection criteria by which a decision is made on the decision itself. The output of the disclosed analytical methods can identify those selection criteria to which the decision is sensitive and can lead to one or more beneficial decision making outcomes and selections of options and/or solutions. Example outcomes of the methods and products disclosed herein include but are not limited to: highlighting when uncertainty in a criterion can lead to a poor decision, e.g. a misallocation of resources or a poor investment; identifying potential missed opportunities that should be considered. Alternatively, outcomes can reveal alternative investment or research strategies; or provide a basis for appropriately delaying a decision until the selection criteria by which the decision will be made are considered and/or refined in more detail, or changed. Additionally, identification of criterion and/or criteria leading to good decisions and favourable outcomes can be output. Such decisions can require the selection of one or more items based on data or information regarding a larger set of items.

Herein, the term "item" is to be broadly construed and in addition to its customary use also means any physical object, or conceptual or computational representation of an object, or a virtual or physical entity, or construct, that one can wish to select for an objective. Further, in addition to its ordinary and customary meaning, the term "item" is a broad term and general term broadly meaning and comprising, as non-limiting examples, physical objects, non-physical objects, designs, concepts, options or solutions. Items can be real or hypothetical. The term "item" also means that which can be chosen or selected.

The invention disclosed herein can be used to analyse selection criteria for the selection of numerous forms of items, including, but not limited to: physical goods, such as consumer products, property or commodities; virtual and/or physical entities, services such as vacations, entertainment or healthcare; financial instruments, such as stocks and shares, currencies or derivatives; and designs for physical objects, such as engineering designs, architectural designs, designs for consumer products.

For example, a decision could involve choosing a vacation from many possible vacation options and considering many selection criteria, such as cost, location, reviews of characteristics such as cleanliness of accommodation, proximity to an attraction, family friendliness and others. Another example decision could regard a selection of one or more stocks to include in a portfolio based on selection criteria such as a price over earnings ratio, past performance, recommendations from analysts, sector and risk. In yet another example, a decision could regard a selection of a car to purchase based on selection criteria such as cost, fuel efficiency, reliability, reviews and other factors. In an even further non-limiting example, decisions could regard a selection of one or more designs of a device to prototype based on selection criteria such as estimates of manufacturing cost, cost of raw materials, market value and others; or selection of one or more molecules, compounds, moieties, materials or reactants based on a broad range of selection criteria relating to intrinsic and/or extrinsic properties. The methods disclosed herein can also be used to make selections and decisions during the drug and/or compound research and development process.

When making a selection based on complex information, a set of selection criteria can be defined. Such selection criteria can be used to prioritise the possible collections of items which can be selected, and to choose one or more of such items, based on available data for which the selection criteria have been defined. The selection can depend on the selection criteria defined regarding the properties or characteristics of the item or items of the selection.

The selection can be based in part or wholly on the impact of a selection criterion on the choice. In a non-limiting example, returning to the vacation decision-making scenario, a hotel choice can be based on a criterion relating to a hotel's distance from the beach, e.g. less than 500 yards to the beach, leading to the selection of a hotel meeting this criterion. However, if a different hotel were more suitable than the first based on other selection criteria, that different hotel might be the preferred choice, even if it were farther from the beach, e.g. 600 yards to the beach. In this example case, a better hotel would be found by only slightly relaxing the criterion relating to the distance to the beach. If the 500 yard criterion were a hard cut-off, the preferred hotel would be rejected and potentially would never be identified as a missed opportunity.

In a non-limiting car purchase scenario, a selection of a car could be more dependent upon cost, fuel efficiency, reliability or another factor, than on a car's paint colour.

These non-limiting examples are examples of cases in which the 'sensitivity' of a selection to the selection criteria used to make the selection is a factor. A selection can be particularly challenging for the decision-maker when the data, factors or characteristics on which the selection is based is imprecise or uncertain. Sources of uncertainty and imprecision in data can include: experimental variability in a measurement, environmental sources of variation in the behaviour of a device or mechanism, statistical error in a calculation, differences in opinion or uncertainty in an estimate. Imprecision can also originate with human factors, opinion, perception or intangible characteristics.

Manually determining the sensitivity of a selection to the selection criteria used by a decision-maker can be difficult or not possible. Uncertainty in the underlying data increases complexity making it difficult or not possible to determine when the change in selection would be statistically significant, such as when such a change in selection would be likely to result in a qualitatively different outcome to the selection process. The issues which the methods herein resolve regarding of sensitivity to selection criteria are typically not considered by decision-makers because the complexity of the analysis is prohibitive.

This disclosure in its many and various embodiments solves the problem of resolving and utilizing sensitivity to selection criteria in decision making and selection of options, solutions and items. The methods disclosed are not limited regarding the type of decision, the amount of data, the nature of the data or the volume of data.

The methods disclosed herein achieve a robust approach to investigate the sensitivity of a selection to a multi-parameter profile of selection criteria and their importance. This can be important if the correct and/or optimal selection criteria on which to base the decision are not known with confidence, because a small change in a criterion and/or multiple criteria can result in a very different outcome for the decision, which would indicate a high risk of making a poor decision. In the alternative, a small change in a criterion and/or multiple criteria can result in identification of an item that is better than those that would have been otherwise selected using the original selection criteria, resulting in a significant benefit from making a correct decision. Thus the methods disclosed herein can determine the best, or optimal, selection criteria on which to base a decision. The methods herein can be applied when the underlying data on which the selection is based has significant uncertainty.

The methods disclosed herein can be used when selecting a single item or multiple items. The methods herein can be used for selecting multiple items that are each intended to or can achieve a single objective or objectives; or for selecting multiple items that are intended in combination to, or can, achieve a single objective or objectives. Multiple items can be analysed independently, in relation to one another, in series or concurrently. As non-limiting examples, it can be desirable to select multiple stocks in which to invest that are each expected to individually provide the maximum return on investment or, alternatively, it can be desirable to select a portfolio of multiple stocks that in combination are expected to achieve the best return on investment. In these examples, in the former case a number of similar stocks can be selected, potentially increasing the risk, while the latter case can correspond to a hedging strategy.

In a non-limiting example, in the discovery and design of chemical compounds for use as pharmaceuticals, pharmaceutical compounds, drugs, candidate drugs, treatments, medicines, agrochemicals, food additives, flavourings, cosmetics, reactants, catalysts, or for other applications without limitation, it is often necessary to consider a large number of compounds, from which a smaller subset can be selected for further investigation, or a particular compound chosen. These compounds can be 'virtual', i.e. not yet synthesized and exist only as a design on paper, electronically or stored on a computer, or can have been synthesized and tested in one or more practical experiments. The process of refinement of the selection can be iterative, whereby progressively smaller subsets of compounds can be selected for more detailed and expensive experimental tests before a single compound is finally chosen. In an embodiment, a virtual and/or empirical data can be used.

The selection(s) of compounds at each stage of analysis can be based on the data available for these compounds at each respective stage. These data can be derived from calculations or predictions made on a computer, or from experimental measurements or otherwise determined or available. Examples of properties that can be considered include but are not limited to:

Simple calculated properties, e.g.: molecular weight (MW); number of heavy atoms (i.e. atoms which are not Hydrogen; "NH"); and counts of functionalities, such as number of hydrogen bond donors ("HBD"), number of hydrogen bond acceptors ("HBA"), number of aromatic rings ("AROM") or number of undesirable chemical functionalities; and/or Physicochemical properties, e.g.: solubility; lipophilicity (log P); polar surface area ("PSA"), viscosity, melting point and surface tension; and/or Biological properties e.g.: binding affinity to one or more proteins; inhibition or activation in an in vitro assay; permeation of cell membranes; metabolic stability; toxicity; absorption through intestine, skin or lung; pharmacokinetic parameters such as bioavailability, clearance or half-life, measured in animals or human; efficacy in cells; efficacy in animal models or human patients.

A selection of compounds can be made on a basis of the values of one or more properties. For a single property, the selection can be made based upon a criterion representing a hard cut-off, or filter, such as in non-limiting example an upper bound (e.g. MW<500), a lower bound (e.g. target inhibition pKi>5) or a required range (e.g. 0<log P<5).

For categorical data and/or selection criteria (e.g. "High"/"Medium"/"Low"), a simple selection criterion can define one or more required categories (e.g. plasma protein binding=Low). Such analysis can be used when potential solutions are readily categorized.

In a non-limiting example, compounds can be prioritised by using a "desirability function" which can be a mathematical function that relates the value of a property to a numerical value representing the desirability of the outcome, such as in a non-limiting example ordering compounds by their respective scores and identifying the compounds with the highest scores. In an embodiment, a "score" can be the value generated from the property value by the desirability function. In addition to its ordinary and customary meaning, "score" can also encompass any output used to prioritise, rank or compare items. Non-limiting examples of desirability functions can be shown in FIGS. 3A through 3F. The term "criteria" or "criterion" or "selection criteria" as used herein is to be broadly construed and can include both simple selection criteria and desirability functions, in addition to the each of these terms ordinary and customary meaning.

Compounds can be selected based on multiple properties which can be analysed singly, simultaneously and/or in series and/or a combination of concurrent and serial analysis. Compounds can be selected through the use of for non-limiting example: numerical methods, multi-parameter optimization, multi-dimensional optimization, multi-criteria decision making, or multi-objective optimization. In the following discussion these methods and other equivalent methods described by other terms, whether such terms are used together or individually, will be referred to herein as "MPO" methods.

MPO methods can be used to analyse data on multiple properties of items which are to be assessed to select or prioritise items. The data on multiple properties can be analysed based on a single property, multiple properties, or in combination. Optionally, the data analysis can analyse how two or more properties affect or impact one another. By considering properties of items in combination, MPO methods can identify items that achieve an optimal balance of properties, even if every individual property is not, individually, optimal. The use of MPO methods can avoid any individual property having an inappropriately large impact on the selection of items, which can lead to inappropriately rejecting solutions that are optimal overall because the values of only one or a small number of properties are sub-optimal. The use of MPO methods can also save time and resources in the optimisation of items by directing the search for an optimal item towards solutions that optimise multiple properties simultaneously instead of attempting to optimise each individual property individually in sequence.

In a non-limiting example, MPO methods can assess each item against a profile of selection criteria relating to the properties of the items. A profile can be expressed as a series of filters which must all be satisfied by a selected compound, e.g. MW<500 and pKi>5 and 0<log P<5. Alternatively, items can be prioritised by combining the scores for the individual properties to give an "overall score" for the item, ordering and/or ranking the items by their overall scores and selecting the items with the highest overall score values or, if the score is defined such that the lowest overall scores are best, those with the lowest overall score values. The scores for the individual properties can be combined in many ways to calculate the overall score for an item, all of which are intended to be encompassed within the scope of this disclosure, for example by summing the individual property scores, multiplying the individual property scores or calculating their arithmetic or geometric mean. An illustration of a profile of selection criteria is shown in FIG. 4.

In an embodiment, different selection criteria, such as property criteria, can be given different levels of importance related to the overall objective for which compounds are being considered for selection. For example, some properties can be critical to success. In some instances, failure to satisfy such critical selection criteria can justifiably result in absolute rejection of the item. However, other parameters can have a lower priority (such as those which are nice to have, though not critical) and failure to meet such selection criteria would not have a significant negative impact on the success of the item. The importance of a property regarding its impact on decision making can be accounted for by the methods disclosed herein. Such impact on decision making can be reflected in an importance value of a property. In non-limiting example, an importance value can justify a multiplier for the score due to importance of the property. Thus, the importance can impact a power to which the score is favourably impacted and/or raised when meeting a criterion, or the importance can be a basis for a penalty associated with failure to meet a criterion.

The prioritisation and selection of items is further complicated in that data available often have significant uncertainty. This uncertainty can be due to variability inherent in the methods used to experimentally measure properties or statistical errors in computational predictions of properties.

Methods for selection and prioritisation of items can take this uncertainty into account, to avoid inappropriately rejecting items due to uncertain data, which can lead to the loss of valuable opportunities. One non-limiting example of such an approach is to prioritise items according to a score representing the probability of achieving the maximum possible score, as defined by the selection criteria. The uncertainty in an overall score can also be calculated to clearly identify when items can be confidently distinguished (i.e. when the probability of their score being equal is small) or when the data available do not confidently distinguish the items.

In a non-limiting example, a choice of the selection criteria relevant to decision making and assigning respective importance to such criteria with which to prioritise items for an objective can be determined based on education, knowledge, history, experience, intuition, opinion, expert opinion, or by using manual, analytical or computational methods, or otherwise, to identify important selection criteria that distinguish successful and unsuccessful items. In an embodiment, historical data can be used to identify the best selection criteria with which to distinguish successful and unsuccessful compounds. Even expert opinion can be subjective and often there can be limited historical data with which to identify the most appropriate selection criteria and their importance values with confidence. The sensitivity of the selection of items to the specific selection criteria and importance values chosen can also be considered. If there is uncertainty about the best selection criteria and importance values to use to make a selection and small changes to those parameters would significantly change the items that would be selected, the best selection criteria and importance values can be analysed or a broader range of items can be selected that satisfy different selection criteria and importance values within a reasonable range of those originally specified.

Embodiments of the invention disclosed herein can comprise a rigorous, automatic method for analysis of selection criteria and their importance, for selection of one or more items for an objective from a larger set of items, based on property data for the items. Embodiments of this method reveal the selection criteria and importance values to which the selection of items is most sensitive and the impact of perturbations to the selection criteria and importance values on the items that will be selected. The determination of the sensitivities of the selection criteria and their importance values can be computed in a statistically rigorous manner.

Embodiments of the disclosed method can use and/or identify one or more selection criteria for an item's properties and optionally their associated importance values. The selection criteria and/or importance values can be used for the selection of one item or a number of items by a decision-maker. Embodiments of this method can furthermore accept a data set containing one or more items for which the values of one or more properties have been determined, of the properties defined in the selection criteria. There is no limit to the number of items which can be considered, evaluated, analysed or selected by the methods disclosed herein. Items can be singly evaluated, concurrently evaluated or analysed in a manner accounting for respective items' impact on one another. The methods can be used to identify beneficial items and/or those with unexpected quality in relation to modified selection criteria.

In addition to its ordinary and customary meaning "objective" as used herein additionally encompasses any purpose, requirement, specification, goal, application or use for which an item or items can be selected. In embodiments, an "objective" can be a positive requirement, e.g. selection of an item or items which are likely to achieve a desired outcome, or can be a negative requirement, e.g. selection of an item or items to be rejected because they are unlikely to achieve a desired outcome or to prevent an unwanted outcome. An "objective" can be any outcome which one seeks to satisfy by making one or more choices. The objectives for which one or more items can be selected can be numerous. Non-limiting examples include selecting items for purchase, sale, disposal, manufacture, testing, additional research, compound synthesis, product or compound development, trials and prototyping.

In an embodiment, this invention can be used for analysis of selection criteria for items representing compounds intended for a drug discovery objective. In drug discovery, data can be generated for any number of compounds and for a wide variety of properties. These property data can be used for selection of compounds to progress for further, more detailed, investigations and ultimately to select one or more candidate drugs for testing in pre-clinical and clinical development. In non-limiting example, a type of a drug discovery objective can be determined based upon the stage of a drug discovery project. An objective can comprise an interim objective that can be met prior to progressing to a later stage of drug discovery or into development or the ultimate objective of identifying a compound as a candidate drug for a safe and efficacious treatment in the patient (human or animal). In non-limiting examples, an objective can be achieving acceptable potency in a cell-based assay; achieving efficacy in an animal model of the disease targeted by the project at an acceptable dose; achieving a suitable pharmacokinetic profile in an animal species, e.g. oral bioavailability, volume of distribution, half-life, or penetration of the blood-brain-barrier; avoiding toxicity at an acceptable dose in an animal species; selection as a development candidate drug; achieving an efficacy in the patient population at an acceptable dose; achieving a suitable pharmacokinetic profile in the patient population, e.g. oral bioavailability, volume of distribution, half-life or penetration of the blood-brain-barrier; avoiding side effects at an acceptable dose in the patient population. A successful, safe and efficacious drug can satisfy multiple objectives. These examples of objectives are not to be considered limiting and the methods and embodiments of this invention are unlimited in the objectives which can be employed.

Embodiments of this invention can also be used to produce results for other chemical research objectives, e.g. agrochemicals, cosmetics and medical diagnostic compounds, compounds, chemicals, moiety, structures, objects or virtual entities or objects.

In addition to the customary and ordinary meaning of the term "molecule", herein the term is to be broadly construed to also mean "two or more atoms held together by at least one chemical bond". The chemical bond can be of any type or nature, without regard to the nature, such as but not limited to covalent, ionic, hydrogen, electromagnetic, or other. Herein the term "compound", in addition to its customary and ordinary meaning is used synonymously with the term "molecule". Herein the term "drug" is to be broadly construed to mean, in addition to its customary and ordinary meaning, "a molecule for use to treat an illness, relieve a symptom and/or modify a chemical process in the body of a human or other species".

In its many embodiments, this invention can be used to produce results for drug discovery regarding any size or complexity of compound. It can be broadly used in research comprising in non-limiting example small molecule research (e.g., molecules with a molecular weight of <1000 Da), medium molecule research (e.g., oligonucleotides), large molecule research (e.g., vaccines, antibodies or protein therapeutics), as well as for compositions, solutions and mixtures. The molecules for which the methods disclosed herein can be utilized can be of any nature and the scope of such molecules includes drug compounds and non-drug compounds, organic or inorganic compounds, as well as simple and complex molecules. These examples are non-limiting and the methods disclosed herein can be used for research of any compound, composition, mixture, solution and/or molecule. Mixtures and mixes of multiple compounds can also be analysed by the methods disclosed herein.

FIG. 1 is a functional block diagram of a computer system which performs execution of computer processes. The computer systems include a computer 100, a memory 102, a processor 104, an optional network interface 106, an optional bulk storage 108, an input/output interface 110, a display 112, and databases. The databases can compromise: a database of data regarding selection profile 115; and a data set database 116; and/or an optional proportion input 117 database; and/or an optional level of significance input 118 database; and/or an optional fraction input 119 database.

The computer system can also comprise an input/output buffer 121, a selection profile buffer 122, a data set buffer 123, and optional proportion buffer 124, an optional level of significance buffer 125, and optional fraction buffer 126, as well as a parameter sensitivity buffer 127, a perturbation sensitivity buffer 128 and an item scores buffer 129.

The computer can execute a program logic 130. The program logic 130 which can be executed by the computer's processing unit(s) can comprise a logic to calculate item scores 131, and/or a logic to perturb selection criteria 132, and/or a logic to perturb selection criteria importance 133, and/or a logic to calculate sensitivity to perturbation 134, and/or a logic to calculate sensitivity to criterion or importance 135.

Figure 2:
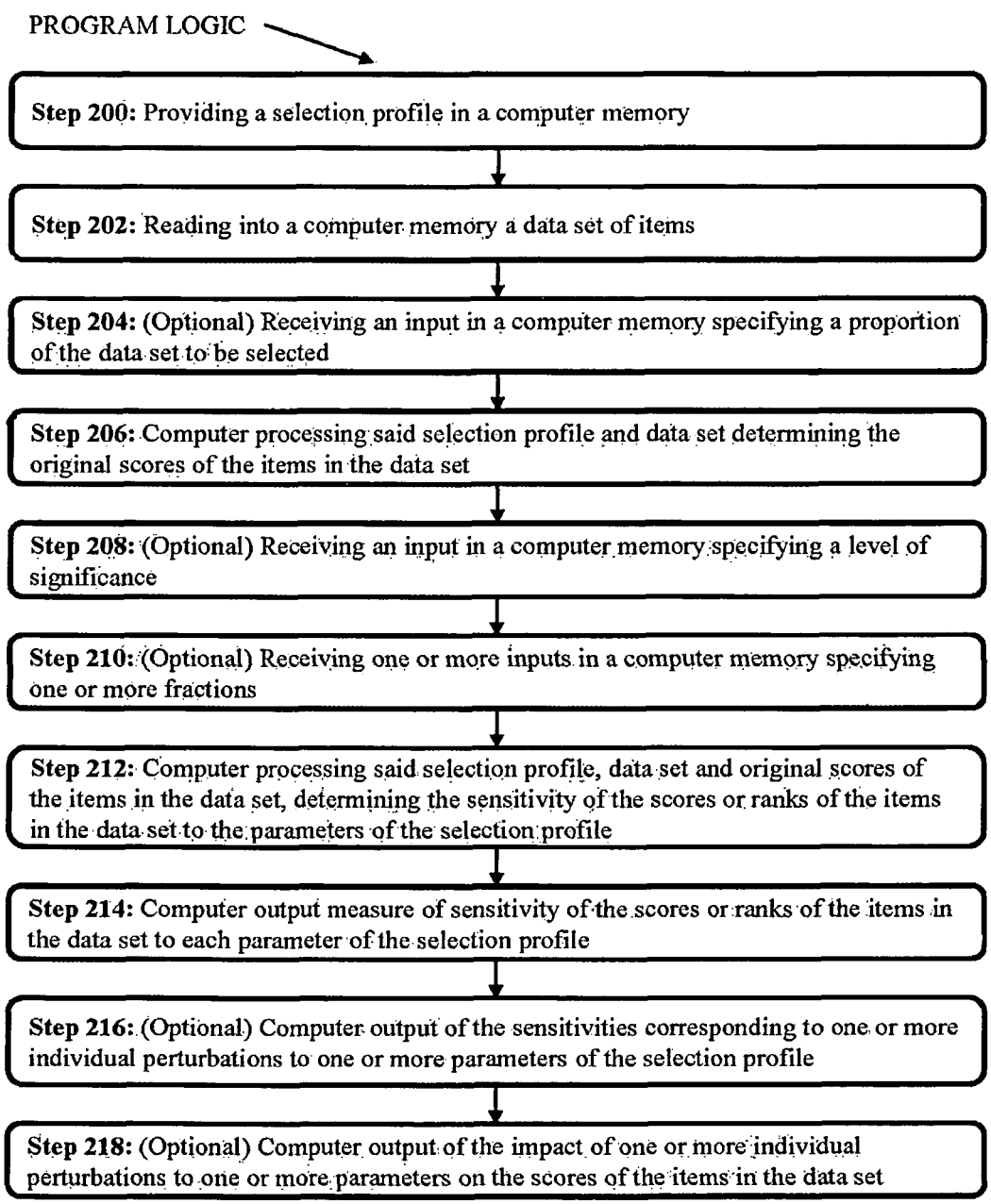
FIG. 2 is a process used for determining the sensitivity of a selection of items to the selection criteria and their importance values.

FIG. 2 is a process used for determining the sensitivity of a selection of items to the selection criteria and their importance values. FIG. 2 is a flow diagram of an embodiment for a sequence of steps which can be carried out by the computer system of FIG. 1. FIG. 2 is also an embodiment of computer readable program code logic and data flow for an embodiment of the method for determining selection criteria from a data set. While FIG. 2 shows the program logic having a sequence of steps, in its many embodiments, the steps of the data analysis can be implemented in different orders, sequences and/or steps. This flexibility regarding sequence can be utilized in embodiments when the data associated with a step is available in a computer memory at the time the step is executed. Thus, where data is available for computer processing, the steps can be used in various sequences and implementations.

Step 200 can be providing a selection profile in a computer memory. A selection profile can have selection criteria for one or more item properties and, optionally, an importance value for each selection criterion. As few or as many selection criteria as desired can be used. For convenience and the purposes of the following description in non-limiting example, the properties in the selection profile will be denoted $x_i$, where i is an integer in the inclusive range 1 to M and M is the number of properties in the selection profile and can take any integer value greater than or equal to 1.

Example selection criteria for a single item property can comprise, but are not limited to: an upper or lower bound on the required values of a property; a range of required property values; a desired category for categorical properties; and/or a desirability function. There is no limitation to the nature of the selection criteria or the number of selection criteria. Examples of desirability functions include, but can be not limited to, those shown in FIGS. 3A, 3B, 3C, 3D, 3E, and 3F. Note that a simple upper or lower bound on or range of required property values can be represented by a desirability function. Therefore, the following discussion will describe an embodiment employing desirability functions, as a non-limiting example, but the methods described herein can apply equivalently to simple threshold or range selection criteria or other formulations of selection criteria. In the following description, the desirability function for property $x_i$ will be denoted $d_i(x_i)$.

Optionally, the selection profile can also define the importance of each property criterion to selection of items for the objective. Example embodiments include defining the importance of a criterion for property $x_i$ by a real coefficient c, that can be a multiplier or exponent of the value of $d_i(x_i)$ in the calculation of an item score as disclosed herein or by the difference between the maximum and minimum of the desirability function $d_i(x_i)$.

Figure 3A:
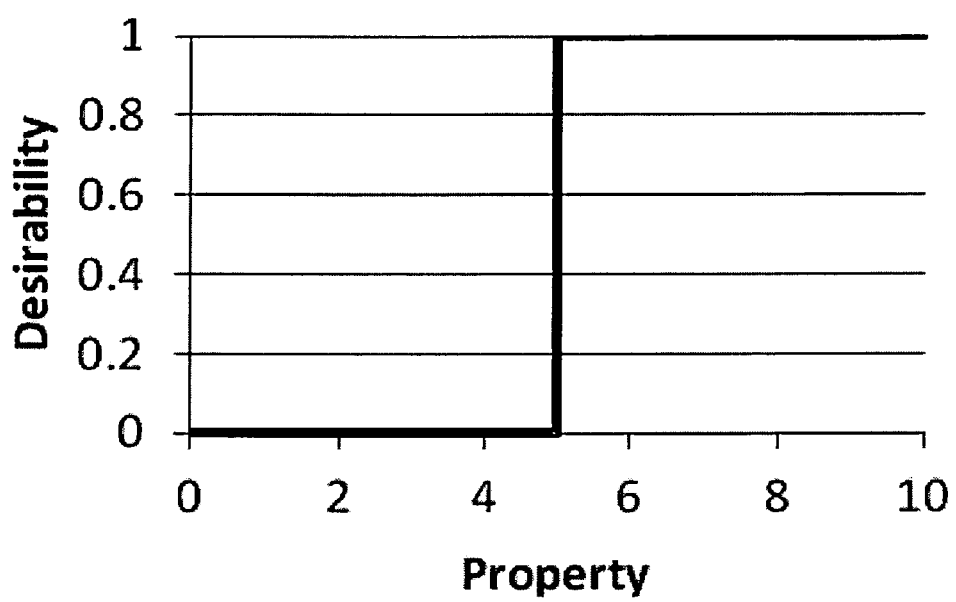
FIG. 3A is an example of a desirability function representing a simple threshold criterion of greater than 5.

FIG. 3A is an example of a desirability function representing a simple threshold criterion of greater than 5.

Figure 3B:
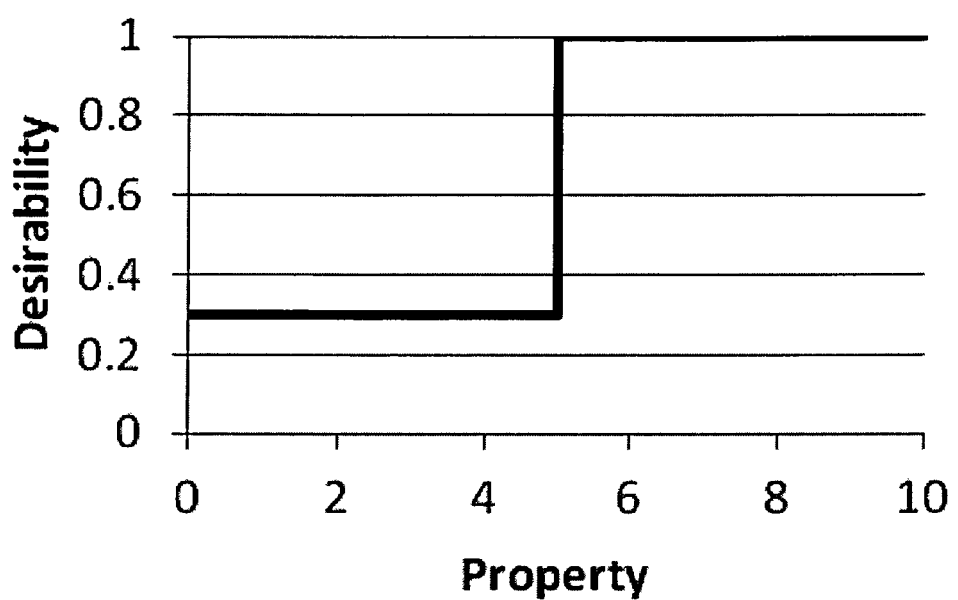
FIG. 3B is an example desirability function representing a simple threshold criterion of greater than 5 where compounds with a property value less than 5 would be less desirable but not rejected outright. The desirability function in this figure represents an equivalent criterion to that in FIG. 3A, but lower importance.

FIG. 3B is an example desirability function representing a simple threshold criterion of greater than 5 where compounds with a property value less than 5 would be less desirable but not rejected outright. The desirability function in this example figure represents an equivalent criterion to that in FIG. 3A, but lower importance.

Figure 3C:
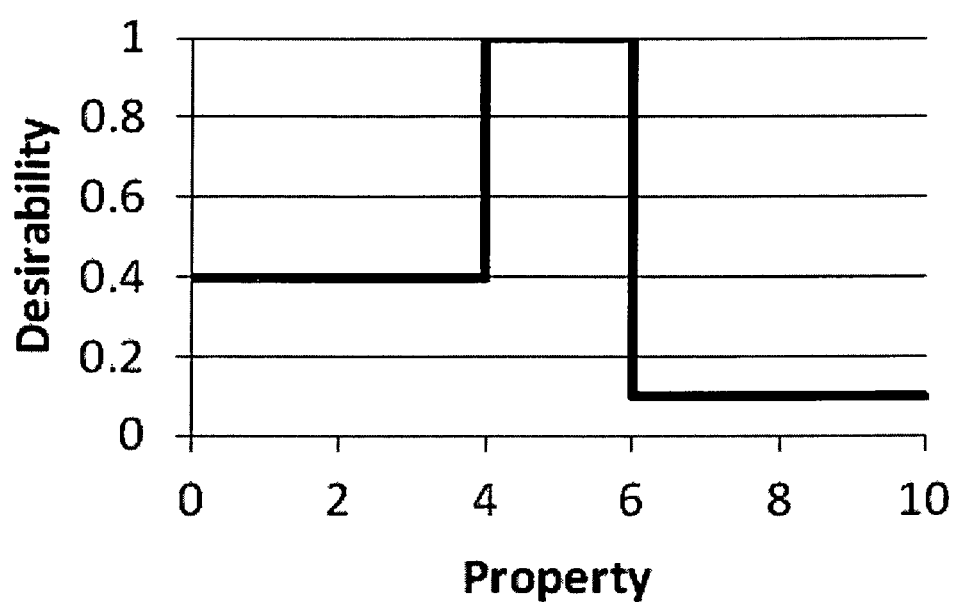
FIG. 3C is an example desirability function representing an ideal property range between 4 and 6; compounds with property values above 6 can be less desirable than compounds with property values less than 4.

FIG. 3C is an example desirability function representing an ideal property range between 4 and 6; in this example compounds with property values above 6 are less desirable than compounds with property values less than 4.

Figure 3D:
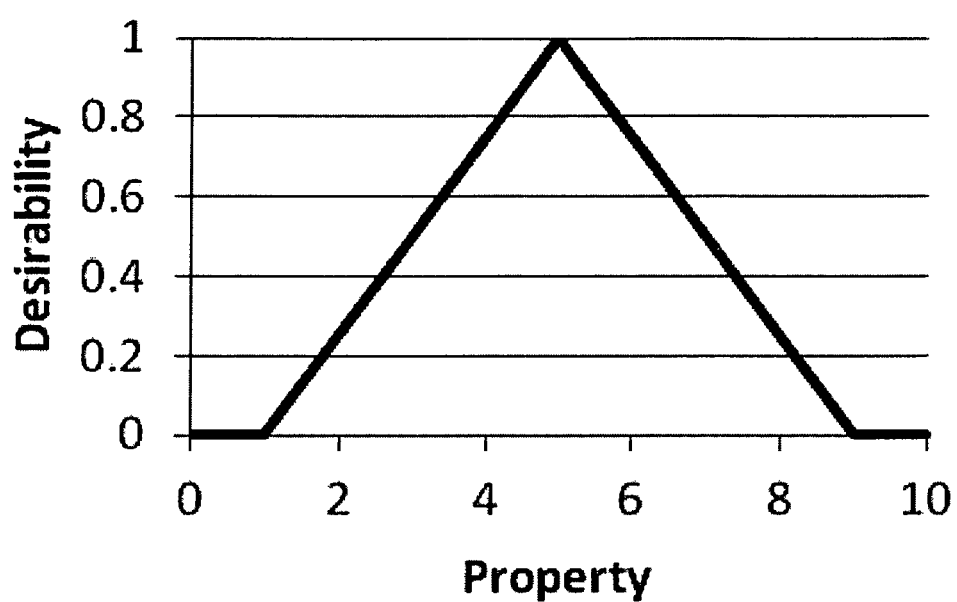
FIG. 3D is an example desirability function representing an ideal property value of 5 with linearly decreasing desirability above and below this value. Items with a property value below 1 and items with a property value above 9 have the lowest desirability.

FIG. 3D is an example desirability function representing an ideal property value of 5 with linearly decreasing desirability above and below this value. Items with a property value below 1 or above 9 would have the lowest possible desirability, on this scale, of 0.

Figure 3E:
FIG. 3E is an example desirability function representing a linearly increasing desirability for property values above 2, with an ideal outcome of a property value above 8.

FIG. 3E is an example desirability function representing a linearly increasing desirability for property values above 2, with an ideal outcome of a property value above 8.

Figure 3F:
FIG. 3F is an example of a non-linear desirability function representing a sigmoidal increase in desirability with a point of inflection at a property value of 5.

FIG. 3F is an example of a non-linear desirability function representing a sigmoidal increase in desirability with a point of inflection at a property value of 5.

Figure 4A:
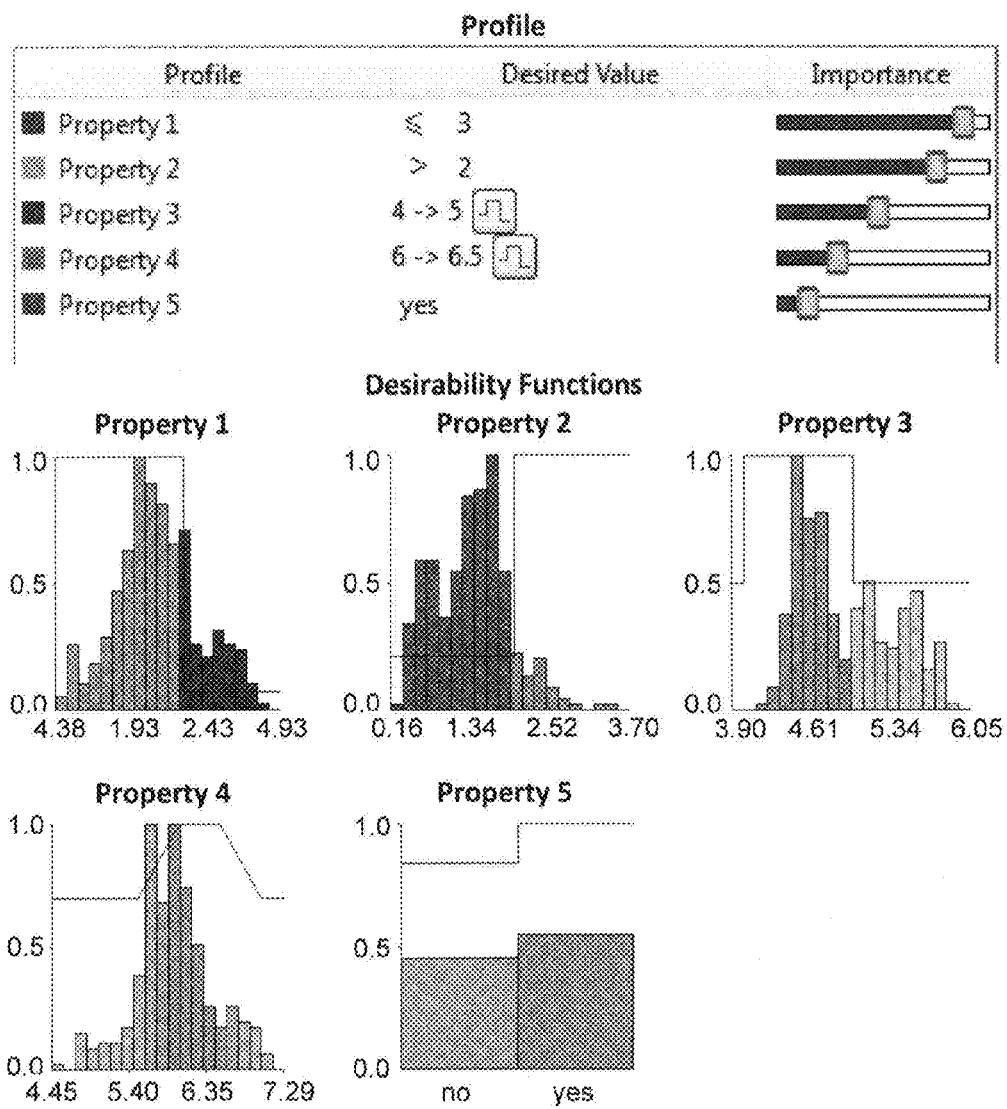
FIG. 4A is an example of a representation of a selection profile for five properties labelled Property 1, Property 2, Property 3, Property 4 and Property 5. The criterion for each property is represented by a desirability function, as shown for each property by the inset plots. The desirability functions are shown as black lines in the inset plots, superimposed on histograms showing the distribution of the properties.

FIG. 4A is a non-limiting example of a representation of a selection profile for five properties labelled: Property 1, Property 2, Property 3, Property 4 and Property 5. The profile in FIG. 4A comprises selection criteria and importance values for each property. In each case, these can be represented by a desirability function as shown by the inset plots. The desirability function for each property in this example is shown as a black line in the corresponding plot, superimposed on a histogram showing the distribution of the property. The criterion for Property 1 is a value less than or equal to 3 three with an importance of 0.93. The criterion for Property 2 is a value greater than 2 with an importance of 0.79. The criterion for Property 3 is a value between 4 and 5, with an importance of 0.5. The criterion for Property 4 is represented by a desirability function with an ideal value for the property in the range of 6 to 6.5, worst outcomes of a value less than 5.5 or greater than 7, linearly increasing desirability, between 5.5 and 6, linearly decreasing desirability between 6.5 and 7 and an overall importance of 0.3. Property 5 is a categorical property with possible values in this example of "yes" and "no", an ideal outcome of "yes" and an importance of 0.16. In this non-limiting example the importance of 0.16 signifies that the difference between the highest score of 1 and the lowest score of 0.84, for this property, is 0.16.

Figure 4B:
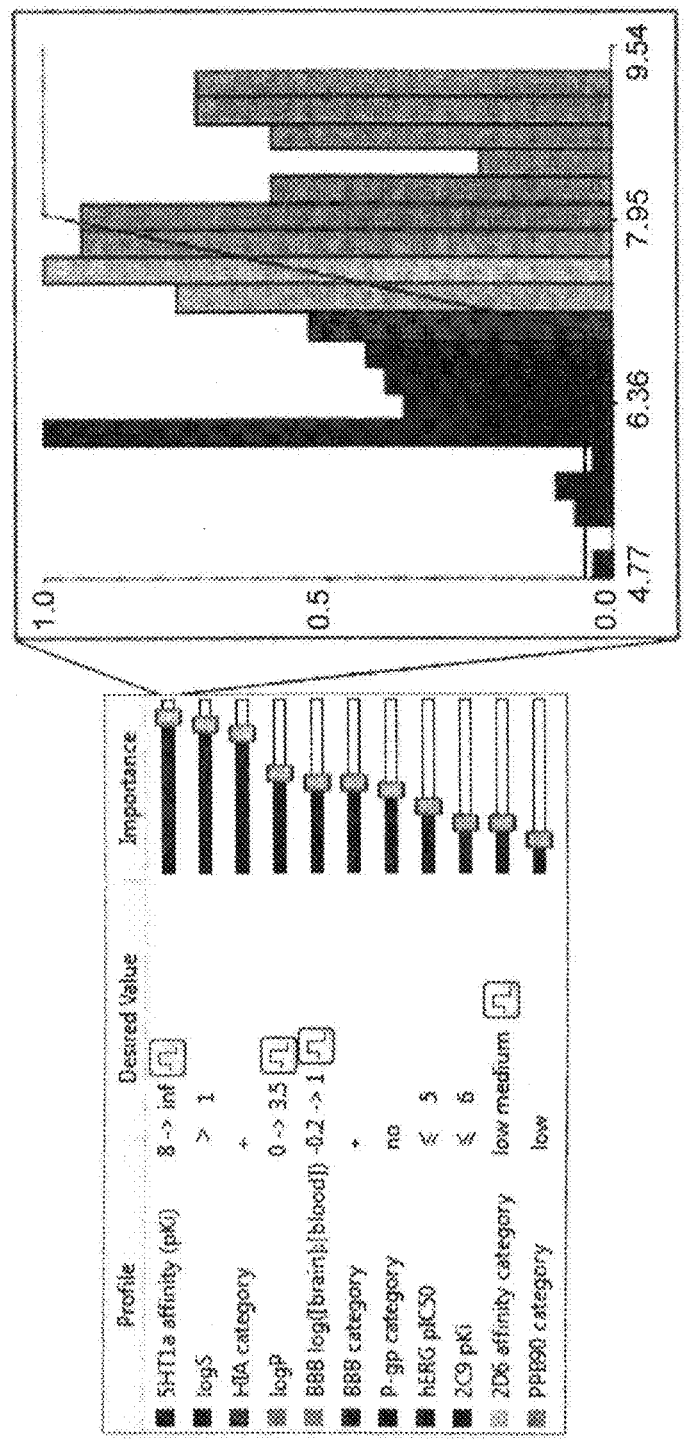
FIG. 4B is an example of a representation of a selection profile for multiple properties. Each criterion is represented by a desirability function, as illustrated for the criterion for the property "pki 5HT1a affinity". The desirability function is shown as a black line in the inset plot, superimposed on a histogram showing the distribution of the property.

FIG. 4B is a non-limiting example of a representation of a selection profile for multiple properties. The example profile in FIG. 4B comprises selection criteria and importance values for multiple quantitative and categorical properties: 5HT1a affinity (pKi), log S, HIA category, log P, BBB log([brain]:[blood]), BBB category, P-gp category, hERG pIC50, 2C9 pKi, 2D6 affinity category, PPB90 category. Examples of selection criteria specified by the selection profile in FIG. 4 include: a lower bound, e.g. log S>1; an upper bounds, e.g. hERG pIC50≤5; a range, e.g. 0<log P≤3.5; a required category, e.g. PPB90=low; and a desirability function indicating lowest desirability for 5HT1a affinity (pKi) below 7, with linearly increasing desirability above 7 to an ideal value of 8 or higher. An ideal item for this selection profile would simultaneously achieve an ideal outcome for all of these properties.

In FIG. 4, each criterion is represented by a desirability function, as illustrated for the criterion for the example property "pki 5HT1a affinity". The desirability function is shown as a black line in the inset plot, superimposed on a histogram showing the distribution of the property.

The desirability functions for the individual properties can be combined into a multi-dimensional desirability function $D(x_1, x_2, \ldots, x_M)$ in numerous ways, or into a number of applied equations and/or relationships. Non-limiting examples include:

$$D(x_1, x_2, \ldots, x_M \mid d_1(x_1), d_2(x_2), \ldots, d_M(x_M), c_1, c_2, \ldots, c_M) = \Sigma_{i=1}^{M} c_i d_i(x_i), \quad \text{Equation 1}$$

$$D(x_1, x_2, \ldots, x_M \mid d_1(x_1), d_2(x_2), \ldots, d_M(x_M), c_1, c_2, \ldots, c_M) = \frac{1}{\Sigma_{i=1}^{M} c_i} \Sigma_{i=1}^{M} c_i d_i(x_i), \quad \text{Equation 2}$$

$$D(x_1, x_2, \ldots, x_M \mid d_1(x_1), d_2(x_2), \ldots, d_M(x_M), c_1, c_2, \ldots, c_M) = \Pi_{i=1}^{M} d_i(x_i)^{c_i}, \text{ or} \quad \text{Equation 3}$$

$$D(x_1, x_2, \ldots, x_M \mid d_1(x_1), d_2(x_2), \ldots, d_M(x_M), c_1, c_2, \ldots, c_M) = \sqrt[\Sigma_{i=1}^{M} c_i]{\Pi_{i=1}^{M} d_i(x_i)^{c_i}} \quad \text{Equation 4}$$

where, in the absence of coefficients defining the importance of each criterion, $c_i=1$ for all values of $i=1 \ldots M$.

The embodiments herein are highly transformative and are technological methods and means which advance computer and software technology and which are robust and transform input, parameters, criteria, knowledge and/or data into useful and value added information upon which a user can base a decision, or which is transformed through technology into information which in itself is a decision, a solution, a result, a product, an output and/or outcome. The transformation of input and/or data by the computer and software embodiments herein achieves decision support and/or decision results previously not possible. The embodiments herein are transformation technologies and are also computer integral technologies to achieve the transformations (e.g. computer processing, calculations, values, results, choices, solutions and outcomes) disclosed and achieved herein.

Herein the a "parameter of a selection profile" is to be broadly construed and includes, without limitation a selection criterion, an importance value of a criterion and a parameter in an equation defining a desirability function in the selection profile.

In an embodiment, as illustrated in the embodiment of FIG. 2, Step 202 can be reading into a computer memory a data set of items and/or data and/or respective data sets for one or more items. In an embodiment, in Step 202 the property values for each item in the data set can be read into the computer memory. These data can be read from a machine readable medium, input from a computer source, or can be input by a user.

In non-limiting example, the data set can contain property data for N items, where N is greater than or equal to one. The property values in the data set can include data for one or more items for one or more of the properties for which a criterion has been defined in the selection profile. It is not necessary for the data set to contain property values for every item and every property in the selection profile. The data set can also contain values for properties that can be not included in the selection profile for one or more items. In an example, the property value for property i ($1 \leq i \leq M$) in the selection profile of item j ($1 \leq j \leq N$) can be denoted as $x_{ij}$.

In an embodiment, the data set can also specify a measure of uncertainty or confidence in one or more of the property values. Non-limiting examples of measures of uncertainty in a property value can be one or more of a standard deviation, standard error or fold variation or, in the case of a categorical property, a probability for each possible category that the property value can take. These non-limiting examples of measures of uncertainty can be used to define a probability distribution for the value of property value $x_{ij}$, denoted $p(x_{ij})$.

In its several embodiments, the method disclosed herein can employ one or more property data and property data types. The disclosure of type, variety and nature of property data employed by the embodiments herein are to be broadly construed and are considered without limitation.

Herein, the term "property data" is to be broadly construed and without limitation. In addition to its ordinary and customary meanings "property data" is to be broadly construed to encompass and/or mean any data associated with an item. The term "data" is used synonymously with "property data"

at times herein. When not used synonymously with "property data", the term "data" in addition to its ordinary and customary meaning means "any data of any type". Both of these terms are to be broadly construed. Step 202 can include loading any or all data associated with one or more items into a computer memory.

The following examples of property data are non-limiting and comprise one or more of: cost; quality; review scores; price over earnings ratio; efficiency; power consumption; physical properties such as temperature, mass, weight or pressure; or performance. Property values can be numerical or categorical. Non-limiting examples of categorical values can be, e.g. good/bad, dislike/like/love, want/need, or high/medium/low. Any, some and/or all of the compound properties and characteristics disclosed herein in non-limiting example can also be used.

Property data can be derived in many ways. It can be calculated, predicted computationally, estimated, measured experimentally or collected from on-line, telephone or paper surveys, and can cover a wide range of different properties, aspects and characteristics. In an embodiment, drug discovery property data can be employed from an unlimited variety of sources. Property data can be for intrinsic and/or extrinsic properties. Property data can be real, calculated, virtual, estimated or otherwise originated. Property data can comprise simple characteristics of a molecule, e.g. molecular weight, number of heavy atoms, counts of hydrogen bond donors and acceptors, polar surface area, number of rotatable bonds. Property data can comprise activity against a biological target(s) of interest. Property data can comprise activity against off-targets, i.e. biological targets against which activity would ideally be avoided. Property data can comprise physicochemical properties such as solubility, $pK_a$ and lipophilicity. Property data can comprise absorption, distribution, metabolism and excretion (ADME) properties measured in vitro, such as membrane permeability (e.g. permeability through Cao2 or MDCK cell lines or artificial membranes), metabolic stability in expressed enzyme systems, liver microsomes or hepatocytes, active transport activity. Property data can comprise pharamacokinetic properties, measured in vivo, such as bioavailability, clearance, half-life, volume of distribution, blood-brain-barrier penetration and concentration in target tissues. Property data can comprise toxicity properties measured in vitro, such as inhibition of the hERG ion channel, AMES mutagenicity or cytotoxicity. Property data can comprise toxicity measures in vivo, based on pathology studies following dosing of the compound of interest. Property data can comprise efficacy in animal models of the disease that is the treatment goal. Any of these example property data, or other data can be employed as a single property data, data or characteristic, or in combination and in any amount of property data from a single property data to extremely large quantities of property data as computer processing, or other technology, can process, utilize or transform.

Property data derived from less expensive, computational or in vitro methods can be used to select compounds for studies involving the more expensive or time consuming methods, such as in vivo pharmacokinetics, efficacy or toxicity studies. The selection of compounds can be an iterative process, in which compounds can be progressed to increasingly time consuming or expensive studies.

Sources for computationally predicted property data can include, but are not limited to, Quantitative Structure Activity Relationship ("QSAR") models, pharmacophore models, docking models and numerical simulations such as physiological-based pharmacokinetic models that can, in turn, take experimental property data as inputs.

Sources for experimental property data can include high throughput screening, in vitro laboratory tests, cell-based assays and in vivo tests in animal models of disease, pharmacokinetics studies and toxicology studies.

Experimental property measurements and computational property predictions can also be generated for compounds intended for other purposes, such as agrochemicals, cosmetics, flavourings or industrial chemicals.

Data used can result from high-throughput screening and computational prediction technologies and can be of any quantity. In a non-limiting example, in the context of drug discovery, data can include compound-related data from the earliest stages of drug discovery. In this non-limiting example, such data can comprise a wide range of target activity, absorption, distribution, metabolism and excretion (ADME) properties, toxicity and predictive modelling data of other properties. In an embodiment, this method can employ any number and type of properties simultaneously or in series, or other combination of processing, to select compounds.

In an embodiment, Step 204 can be an optional step in which a proportion of the data set to be selected can be input for computer processing by the methods disclosed herein. In Step 204, the computer can optionally receive an input in a computer memory specifying a' proportion of the data set to be selected. In non-limiting example, this proportion can be defined as a fraction of the full data set, f ($0<f\leq1$), a percentage of the full data set, g ($0<g\leq100$) or a number of items K ($1\leq K\leq N$). Optionally, in cases where the proportion is a fraction or percentage, the number of items to be selected, K, can be calculated from the fraction or percentage; in non-limiting example by using:

$$K = \lfloor fN \rfloor, \text{ or} \qquad \text{Equation 5}$$

$$K = \left\lfloor \frac{gN}{100} \right\rfloor. \qquad \text{Equation 6}$$

Therefore, the following non-limiting example describes an embodiment in which a fixed number of items K can be specified.

Step 206 comprises a computer calculating the original scores of the items in the data set, using the selection profile provided in Step 200. Original scores can be calculated for all of the items or a subset of the items in the data set. In non-limiting examples: the original scores can be calculated only for those items in the data set for which data for all of the properties in the selection profile are available; original scores can be calculated for all of the items in the data set, even if data are missing for one or more properties in the selection profile; or original scores can be calculated for a random subset of items in the data set.

In Step 206, the compute can process the selection profile and data set determining the original scores of the items in the data set. A score for item j, denoted $s_j$, can be calculated for example from the multi-dimensional desirability function $D(x_1, x_2, \ldots, x_M)$:

$$s_j = D(x_{1j}, x_{2j}, \ldots, x_{Mj}). \qquad \text{Equation 7}$$

In an embodiment, if a measure of the uncertainty is defined in the data set for one or more item property values, then the score, $s_j$, can be calculated as the expected value of the multi-dimensional desirability function $D(x_1, x_2, \ldots, x_M)$. If a measure of the uncertainty is defined in the data set for one or more item property values, then these uncertainties can be propagated through the calculation of the score for each item to define a probability distribution of the score, $s_j$, for item j, $p(s_j)$.

In an embodiment, the probability p(s) can be assumed to be normally distributed with mean, $\bar{s}_j$, given by the expected value of the multi-dimensional desirability function $D(x_1, x_2, \ldots, x_M)$ and variance, $\sigma_j^2$, given by the variance of the of the multi-dimensional desirability function $D(x_1, x_2, \ldots, x_M)$.

Optionally, each item can be assigned a rank, $r_j$, by ordering the items from highest-to lowest-scoring.

Step 208 is an optional step in which a level of significance, denoted for example herein as a, can be input. In Step 208, the computer can optionally receive an input in a computer memory specifying a level of significance. The level of significance, a, can take any real value between 0 and 1, inclusive. In non-limiting examples, values for a can lie in the range 0 to 0.3, or 0 to 0.5, or 0 to 0.7. This can allow the user to optionally focus the consideration of the sensitivity of the scores to perturbation in the selection criteria to those that have a statistically significant effect on the ranking of items.

Step 210 is an optional step in which one or more fractions are input, denoted here as $f_s$, $f_c$ and $f_d$. In Step 210, the computer can optionally receive one or more inputs in a computer memory specifying one or more fractions. The fractions can take any value greater than 0, and optionally and in non-limiting example, can be input as a decimal, rational fraction, percentage or in other form. In non-limiting examples values can lie in the range 0.1 to 0.9. These fractions can optionally allow the user to control the range of perturbations considered in the calculation of the sensitivity of criteria or importance values.

Step 212 comprises a computer processing the selection profile, data set and original scores of the items in the data set, determining the sensitivities of the scores or ranks of the items in the data set to the parameters of the selection profile and/or to perturbations to the parameters of the selection profile.

The sensitivities of one criterion, two criteria or a multitude of criteria in the selection profile can be determined. The sensitivities of one importance value, two importance values or a multitude of importance values can optionally be determined.

In embodiments, the order in which the parameters of the scoring profile are considered is not important. The sensitivity of the scores to perturbations of parameters of the scoring profile can be determined for individual parameters or combinations of parameters of the scoring sequentially, in any order, or concurrently. In non-limiting examples, the sensitivity due to the selection criteria for each individual property followed by the sensitivity due to the importance of each property can be determined in sequence. In another embodiment, for each property in sequence, the sensitivity due to the selection criterion for the property followed by the sensitivity due to the importance of the property can be determined. In yet another embodiment, for each property in sequence, the sensitivity due to the importance for the property followed by the sensitivity due to the criterion for the property can be determined. In a further embodiment, the sensitivity due to the importance and criterion for each property can be determined concurrently. In embodiments, one or more of these types of determinations can be used in series, concurrently or in any combination.

In Step 212, one or more parameters of the selection profile can be each individually perturbed or multiple parameters of the selection profile can be perturbed in combination, producing and/or resulting in a new selection profile. Step 212 comprises a step of computer processing the new selection profile, data set and original scores of the items in the data set, determining the sensitivity of the scores of the items in the data set to the parameters of the selection profile. The order in which the parameters of the scoring profile are considered is not important. The sensitivity of the scores to perturbations of parameters of the scoring profile can be determined for individual parameters or combinations of parameters of the scoring sequentially. The sensitivity of the scores to perturbations of parameters of the scoring profile can be determined in any order, sequentially, randomly, in combination or concurrently. In non-limiting examples, the sensitivity due to the selection criteria for each individual property followed by the importance of each property can be determined in sequence. In another non-limiting example, for each property in sequence, the sensitivity due to criterion for the property followed by the sensitivity due to the importance of the property can be determined. In yet another non-limiting example, for each property in sequence, the sensitivity due to the importance for the property followed by the criterion for the property can be determined; or the sensitivity due to the importance and criterion for each property can be determined concurrently.

In an embodiment, for each such perturbation(s), the new selection profile can be used to calculate a new score for each item in the data set, denoted $s_j'$, using the same method as that used for the calculation of the original scores, $s_j$. These new scores, $s_j'$, for a given perturbation can be compared to the original scores for the items in the data set, $s_j$, to calculate a measure of the sensitivity of the scores, ranks or selection of the items in the data set to that perturbation. New scores can be calculated for all of the items or a subset of the items in the data set. In non-limiting examples: the new scores can be calculated only for those items in the data set for which data for all of the properties in the selection profile are available; new scores can be calculated for all of the items in the data set, even if data are missing for one or more properties in the selection profile; or new scores can be calculated for a random subset of items in the data set. New scores should be calculated for at least one item for which an original score was calculated in Step 206.

In various embodiments, perturbations to a parameter of the selection profile that can be considered include, in non-limiting example; a change in an upper or lower bound that the corresponding property must satisfy for an item to be selected, a change in a range of values in which the corresponding property must lie for an item to be selected; a change in the parameters defining the desirability function for a property; or a change in the importance value of a property.

In an embodiment, the effects of one or more rigid shifts in a desirability function for a property on the items' scores can be evaluated. This can, in non-limiting example, be used to identify when an increase or decrease in the required value for a property would change the item scores in a statistically significant manner. In this case, the new item scores, $s_j'$, can be calculated for a rigid shift, $\Delta x_k$, in the desirability function $d_k(x_k)$ for property k, i.e.

$$s_j'(\Delta x_k) = D(x_1, x_2, \ldots, x_M | d_1(x_1), d_2(x_2), \ldots d_k(x_k + \Delta x_k), \ldots, d_M(x_M), c_1, c_2, \ldots, c_M).  \quad \text{Equation 8}$$

Figure 5:
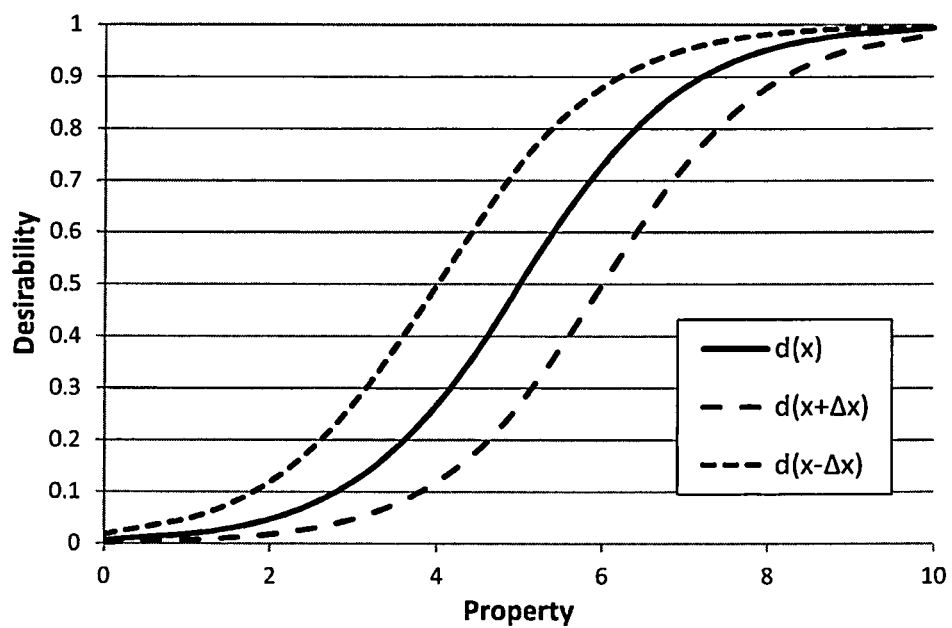
FIG. 5 is an example of the perturbation of a desirability function d(x) by rigid shifts $+\Delta x$ and $-\Delta x$.

Examples of rigid shifts in a desirability function can be illustrated in FIG. 5. FIG. 5 is a non-limiting example of the perturbation of a desirability function d(x) by rigid shifts $+\Delta x$ and $-\Delta x$.

In another embodiment, the effects of changes in the importance of property selection criteria on the items' scores can be considered. In this case, the new item scores, $s_j'$, can be calculated for a shift in importance, $\Delta c_k$, for property k, i.e.

$$s_j'(\Delta c_k) = D(x_{1j}, x_{2j}, \ldots, x_{Mj} | d_1(x_1), d_2(x_2), \ldots, d_M(x_M), c_1, c_2, \ldots, c_k + \Delta c_k, \ldots, c_M).$$

Equation 9

In another embodiment, where the importance of a property, k, is defined by the difference between the maximum and minimum of the desirability function $d_k(x_k)$, a perturbation $\Delta d_k$ to the importance can be reflected by a rescaled desirability function:

$$d_k'(x_k) = (d_k(x_k) - \min(d_k(x)))\left(1 - \frac{\Delta d_k}{\max(d_k(x)) - \min(d_k(x))}\right) + \Delta d_k + \min(d_k(x)).$$

Equation 10

Figure 6:
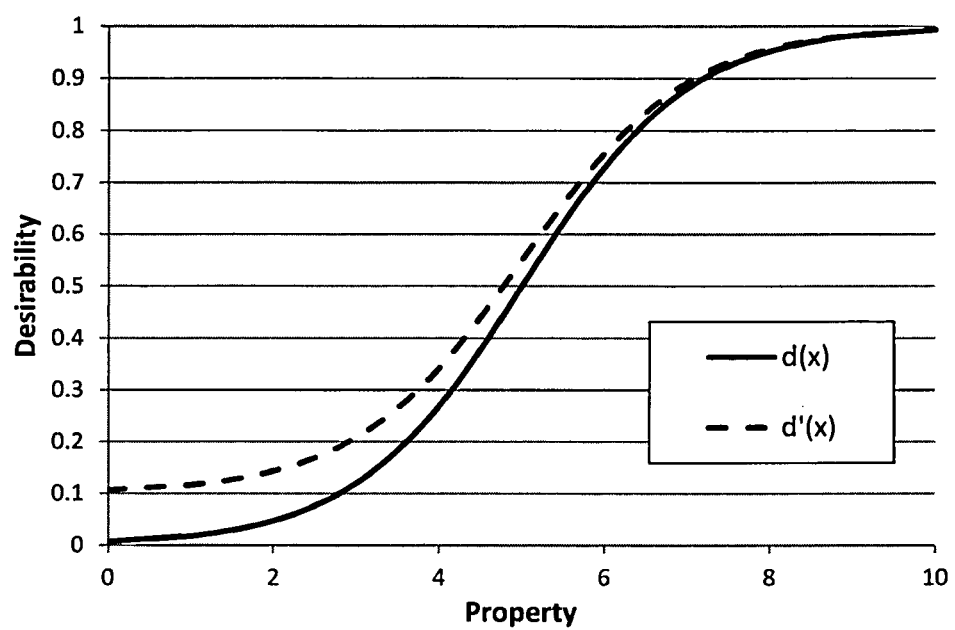
FIG. 6 is an example of the perturbation of a desirability function d(x) by a change in importance of $\Delta d$ to give a perturbed desirability function d'(x)

An example of such a perturbation in importance is illustrated in FIG. 6. FIG. 6 is an example of the perturbation of a desirability function d(x) by a change in importance of $\Delta d$ to give a perturbed desirability function d'(x).

In the embodiment of FIG. 6, the new item scores can be calculated as:

$$s_j'(\Delta d_k) = D(x_{1j}, x_{2j}, \ldots, x_{Mj} | d_1(x_1), d_2(x_2), \ldots, d_k'(x_k), \ldots, d_M(x_M)).$$

Equation 11

Where a measure of the uncertainty is defined in the data set for one or more item's property values, these uncertainties can be propagated through the calculation of the new score for each item to define a probability distribution of the new score for item j, $p(s_j')$.

In an embodiment, the probability distribution for the new score, $p(s_j')$, resulting from a rigid shift $\Delta x_k$ to the desirability function $d_k(x_k)$ for property k can be defined to be normally distributed with mean, $\bar{s}_j'(\Delta x_k)$, given by the expected value of the perturbed multi-dimensional desirability function given in Equation 8, $$D(x_{1j}, x_{2j}, \ldots, x_{Mj} | d_1(x_1), d_2(x_2), \ldots, d_k(x_k + \Delta x_k), \ldots, d_M(x_M), c_1, c_2, \ldots, c_M)$$

and variance, $\sigma_j^{2'}(\Delta x_k)$, given by the variance of the perturbed multi-dimensional desirability function, given in Equation 8, $$D(x_{1j}, x_{2j}, \ldots, x_{Mj} | d_1(x_1), d_2(x_2), \ldots, d_k(x_k + \Delta x_k), \ldots, d_M(x_M), c_1, c_2, \ldots, c_M)$$

In an embodiment, where the importance of a property, k, is defined by a coefficient $c_k$, the probability distribution for the new score, $p(s_j')$, resulting from a perturbation $\Delta c_k$ to the importance can be can be defined to be normally distributed with mean, $\bar{s}_j'(\Delta c_k)$, given by the expected value of the perturbed multi-dimensional desirability function, given in Equation 9, $$D(x_{1j}, x_{2j}, \ldots, x_{Mj} | d_1(x_1), d_2(x_2), \ldots, d_k(x_k + \Delta x_k), \ldots, d_M(x_M), c_1, c_2, \ldots, c_M)$$

and variance, $\sigma_j^{2'}(\Delta c_k)$, given by the variance of the perturbed multi-dimensional desirability function, given in Equation 9, $$D(x_{1j}, x_{2j}, \ldots, x_{Mj} | d_1(x_1), d_2(x_2), \ldots, d_k(x_k + \Delta x_k), \ldots, d_M(x_M), c_1, c_2, \ldots, c_M)$$

In an embodiment, where the importance of a property, k, is defined by the difference between the maximum and minimum of the desirability function $d_k(x_k)$, the probability distribution for the new score, $p(s_j')$, resulting from a perturbation $\Delta d_k$ to the importance can be can be defined to be normally distributed with mean, $\bar{s}_j'(\Delta d_k)$, given by the expectation value of the perturbed multi-dimensional desirability function, given in Equation 11, $$D(x_{1j}, x_{2j}, \ldots, x_{Mj} | d_1(x_1), d_2(x_2), \ldots, d_k'(x_k), \ldots, d_M(x_M))$$

and variance, $\sigma_j^{2'}(\Delta d_k)$, given by the variance of the perturbed multi-dimensional desirability function, given in Equation 11, $$D(x_{1j}, x_{2j}, \ldots, x_{Mj} | d_1(x_1), d_2(x_2), \ldots, d_k'(x_k), \ldots, d_M(x_M))$$

Optionally, each item can be assigned a new rank, $r_j'$, by ordering the items from highest-to lowest-scoring according to the new scores.

The sensitivity of the score of a single item can be calculated in numerous ways that reflect the change in the score due to the perturbation of the selection criteria. In a non-limiting example embodiment the sensitivity can be calculated as the difference between the original score for the item, s; and the new score, s', i.e. (s−s'). In an alternative non-limiting example embodiment, the sensitivity can be calculated as the magnitude of the difference between the original score and new score, i.e. |s−s'|. In non-limiting example embodiments, where probability distributions have been estimated for the original and new scores, the sensitivity of the score of a single item to a perturbation can be calculated as the probability that the scores are different, i.e. the probability that the absolute difference in the original and new scores is greater than zero, P(|s−s'|>0), or the logarithm of this probability. In a further non-limiting embodiment, the score can be indicated as sensitive if P(|s−s'|>0)>1−α, where α is a level of significance. In an embodiment, α can be accepted as an optional input at Step 208 or a default value can be assumed, e.g. 0.1. α can take any real value between 0 and 1, inclusive, and values for α can lie in the range 0 to 0.3, or 0 to 0.5, or 0 to 0.7. This can allow the user to optionally focus the consideration of the sensitivity of the scores to perturbation in the selection criteria to those that have a statistically significant effect on the ranking of items.

The sensitivity of the scores, ranks or selection of the items in the data set to the perturbation can be calculated in numerous ways that reflect the aggregate change of the item scores, ranks or selection for the items in the data set for which original and new scores have been calculated. In a non-limiting example embodiment these can include a correlation coefficient between the original item scores, $\{s_j\}$, and the new item scores, $\{s_j'\}$:

$$r(\{s_j\}, \{s_j'\}) = \frac{\sum_{j=1}^{N}(s_j - \bar{s})(s_j' - \bar{s}')}{\sqrt[2]{\sum_{j=1}^{N}(s_j - \bar{s})^2 \sum_{j=1}^{N}(s_j' - \bar{s}')^2}},$$

Equation 12 where $\bar{s}$ is the mean of the original item scores and $\bar{s}'$ is the mean of the new scores.

In this case, the sensitivity of the scores in the data set to the perturbation can be defined as $1 - r(\{s_j\}, \{s_j'\})$.

In an embodiment, the sensitivity of the item ranks can be calculated as $1 - \rho(\{r_j\}, \{r_j'\})$, where ρ is the Spearman's rank correlation coefficient between the original ranks of the items in the data set, $\{r_j\}$, and the new item ranks, $\{r_j'\}$:

$$\rho(\{r_j\}, \{r'_j\}) = \frac{\sum_{j=1}^{N} (r_j - \bar{r})(r'_j - \bar{r}')}{\sqrt[2]{\sum_{j=1}^{N} (r_j - \bar{r})^2 \sum_{j=1}^{N} (r'_j - \bar{r}')^2}},$$ Equation 13 where $\bar{r}$ is the mean of the original item ranks and $\bar{r}'$ is the mean of the new ranks.

In the case where a proportion of the items in the data set to be selected, K, has been input in Step 204, the sensitivity can be calculate by restricting the analysis to a subset of K items from the data set. In non-limiting embodiments K items can be selected with the highest scores, K items can be selected with the lowest scores, the K items centred on the median score for the items in the data set can be selected, or K items can be selected within a standard deviation of a mean of the item scores or a given score value, or a random K items can be selected from the data set. The K items can be selected using the original scores or new scores. In an embodiment, the K items can be selected using the original scores calculated using the unperturbed selection profile.

In the case where a measure of the uncertainty is defined in the data set for one or more item property values and this uncertainty is used to calculate probability distributions for the original and new scores, $p(s_j)$ and $p(s_j')$ respectively, the calculation of sensitivity can optionally be modified to reflect the statistical significance of the changes in the item scores due to the perturbation. In an embodiment, the calculation of sensitivity can optionally be modified to reflect the statistical significance of the changes in the item scores due to the perturbation by adjusting the standard computation of Spearman's rank correlation coefficient. Specifically, if item j has the original score $s_j$ and new score $s_j'$, then the method can calculate the probability that the absolute difference in the original and new scores is greater than zero, $P(|s_j-s_j'|>0)$. If this probability is above a significance threshold a, the score change can be considered to be insignificant and the maximum possible correlation contribution can be assigned to the item. In one non-limiting example embodiment, the maximum possible correlation contribution can be can be assigned to the item by adjusting the new rank $r'_j$ to be equal to $r'_j-(\bar{r}-\bar{r}')$ in the calculation of the Spearman's rank correlation coefficient, i.e. the item is given the same rank translated by the difference between the means of the original and new sets of ranks.

In an embodiment, α can be accepted as an optional input at Step 208 or a default value can be assumed, e.g. 0.1. α can take any real value between 0 and 1, inclusive, and values for α can lie in the range 0 to 0.3, or 0 to 0.5, or 0 to 0.7. This can allow the user to optionally focus the consideration of the sensitivity of the scores to perturbation in the selection criteria to those that have a statistically significant effect on the ranking of items.

In an embodiment, the sensitivities of one or more perturbations of a given parameter in a selection profile can be combined into an overall measure of the sensitivity of the scores, ranks or selection of the items in the data set to that parameter. The perturbations considered correspond to one or more perturbations of the parameter within a reasonable range.

In an embodiment, a reasonable range of values for perturbations of rigid shifts, $\Delta x_i$, to a desirability function, $d_i(x_i)$, for property i is defined by a fraction, $f_s$, of the range of values of property $x_i$ in the data set. $f_s$ can optionally input in Step 210 or a default value can be used. $f_s$ can take any value greater than 0 and in a non-limiting example values can lie in the range 0.1 to 0.9. In an embodiment, the sensitivities can be calculated for a number of perturbations given by $$\Delta x_{ih} = \pm\left(\frac{(h-1)}{H} - 1\right) f_s(\max(x_{ij})),$$ Equation 14 where h is an integer in the range 1≤h≤H and H can take any value greater than or equal to 1 and in non-limiting example values can lie in the range of 2 to 100.

In an embodiment, a reasonable range of values for perturbations to an importance value $c_i$ for property i is defined by a fraction $f_c$ of the importance value $c_i$. $f_c$ can be optionally input in Step 210 or a default value can be used. $f_c$ can take any value greater than 0 and in a non-limiting example values can lie in the range 0.1 to 0.9. In this embodiment, the sensitivities can be calculated for a number of perturbations labelled h, where h is an integer in the range 1≤h≤H, of $$\Delta c_{ih} = \pm\left(\frac{(h-1)}{H} - 1\right) f_c c_i.$$ Equation 15

Here H can take any value greater than or equal to 1 and in a non-limiting example values can be in the range 2 to 100.

In an embodiment, where the importance of a property, i, is defined by the difference between the maximum and minimum of the desirability function $d_i(x_i)$, a reasonable range of values for perturbations $\Delta d_i$ to the importance is defined by a fraction $f_d$ of the maximum value of the desirability function, $\max(d_i(x))$. $f_d$ can optionally be input in Step 210 or a default value can be used. $f_d$ can take any value greater than 0 and in a non-limiting example values can lie in the range 0.1 to 0.9. In this embodiment, the sensitivities can be calculated for a number of perturbations labelled h, where h is an integer in the range 1≤h≤H, of $$\Delta d_{ih} = \pm\left(\frac{(h-1)}{H} - 1\right) f_d \max(d_i(x)).$$ Equation 16

Here H can take any value greater than or equal to 1 and values can be in the range 2 to 100. Note that, in this case, any values of $\Delta d_i$ such that $\min(d_i(x))-\Delta d_i<0$ should be omitted.

An evaluation of the overall sensitivity attributable to a parameter can be defined in numerous ways, including but not limited to: considering the maximum sensitivity due to any one perturbation in the range, considering the mean sensitivity of all perturbations in the range or the median sensitivity of all perturbations in the range. One or more of these considerations can be used, as well as others, to evaluate of the overall sensitivity attributable to a parameter.

Step 214 can be outputting the overall sensitivities for one or more parameters of the selection profile. Step 214 can be the computer output measure of the sensitivity of the scores or ranks of the items in the data set to each parameter of the selection profile. These sensitivities can be output in numerous formats. As illustrated in FIG. 7, in an embodiment a numerical value can be output for each parameter. Other example embodiments include, but are not limited to: a graphical representation for each importance, e.g. as a bar chart, chart, graph, plot, scatter plot, histogram, or line plot, graphical depiction, or display representing the sensitivity of one or more parameters. In an embodiment one or more parameters can be depicted by one or more colours, or each parameter can be represented by a different colour. In another embodiment, the depictions can also be animated or otherwise highlighted, glowing, or emphasized to communicate the result effectively to the user.

From this output a user can identify one or more parameters or combinations of parameters to which the scores, ranks or selection of items in the data set can be insensitive, sensitive, or most sensitive in comparison to one another or within a fixed range, in non-limiting example the range 0 to 1. In embodiments, the sensitivities of parameters or combinations of parameters for the data set can be compared with the sensitivities of different parameters or sensitivities calculated for other data sets or against any desired standards, ranges, references or value or values.

In an embodiment, the user is presented with and can consider the value of a sensitive parameter of a selection profile before committing to a specific profile for analysis with which to select or prioritise items. This flexibility of analytic input reduces missed opportunities for good investments of resources, time or capital due to inappropriate rejection of items or wasted resources, time and/or capital due to the selection of items using inappropriate property selection criteria or importance values.

Step 216 is an optional step of outputting sensitivities for one or more individual perturbations of a single parameter of the selection profile. In an embodiment of, Step 216, the computer can output the sensitivities of one or more individual perturbations to one or more parameters of the selection profile. These perturbations can include those used in the calculation of the overall sensitivity for the parameter and can also include sensitivities for additional values within or outside of that range. The sensitivities for the individual perturbations can be output in numerous formats. In an embodiment, the sensitivities for different perturbations can be output graphically, in non-limiting examples as a scatter plot, plot, graph, line graph, chart, histogram, display or other graphical output. Non-limiting examples of such graphical outputs can be shown in FIGS. 8A and 8B. Other example embodiments include, but can not be limited to output of a numerical value of the sensitivity for each perturbation. A display representing the sensitivity of each perturbation can have one or more colours, be animated, be glowing or otherwise highlighted or emphasized.

Figure 8A:
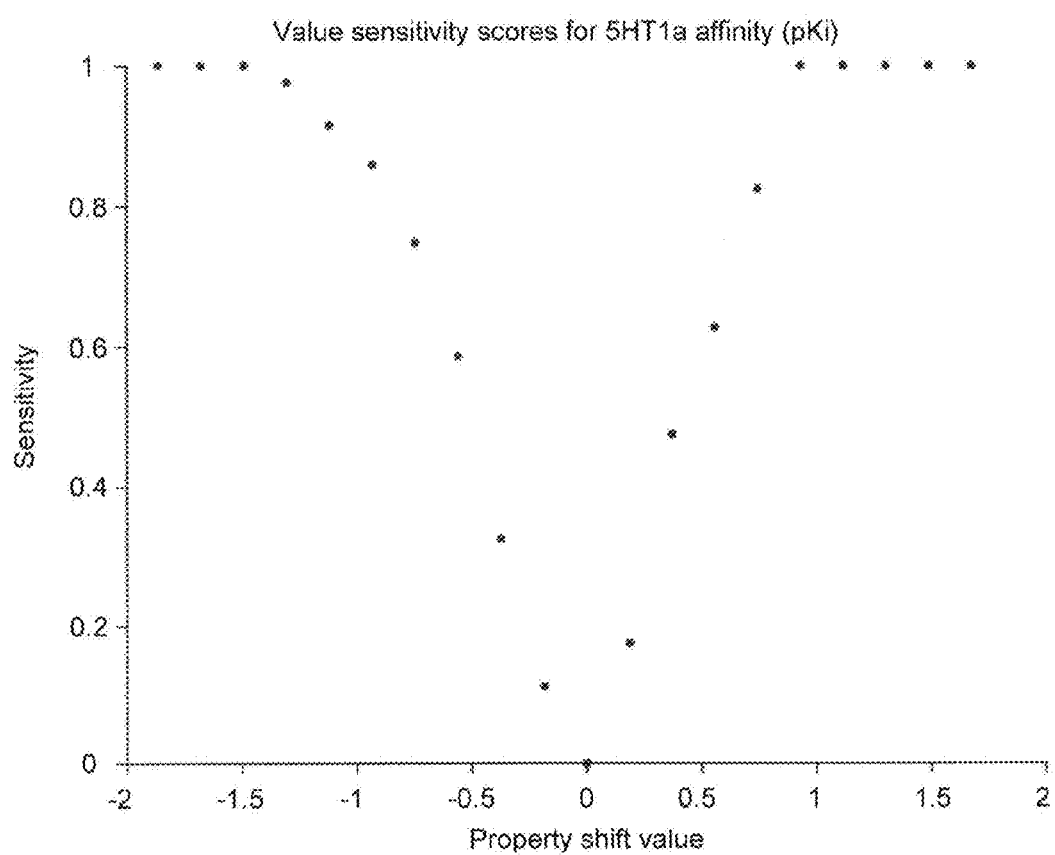
FIG. 8A is an example of the output of the sensitivities with respect to perturbations of a single parameter, namely a rigid shift in a property "5HT1a affinity (pKi)". The value of the shift is shown on the x-axis and the sensitivity due to that shift on the y-axis (the sensitivity is constrained to lie between 0 and 1)

FIG. 8A shows a non-limiting example scatter plot of sensitivity against rigid shift of a desirability function. This is an example of a highly sensitive parameter, as can be seen because the sensitivity increases rapidly for small values of the rigid shift $\Delta x$.

FIG. 8A is a non-limiting example of the output of the sensitivities with respect to perturbations of a single parameter, namely a rigid shift in a property "5HT1a affinity (pKi)". The value of the shift is shown on the x-axis and the sensitivity due to that shift on the y-axis (as shown, the sensitivity can be constrained to lie between 0 and 1).

Figure 8B:
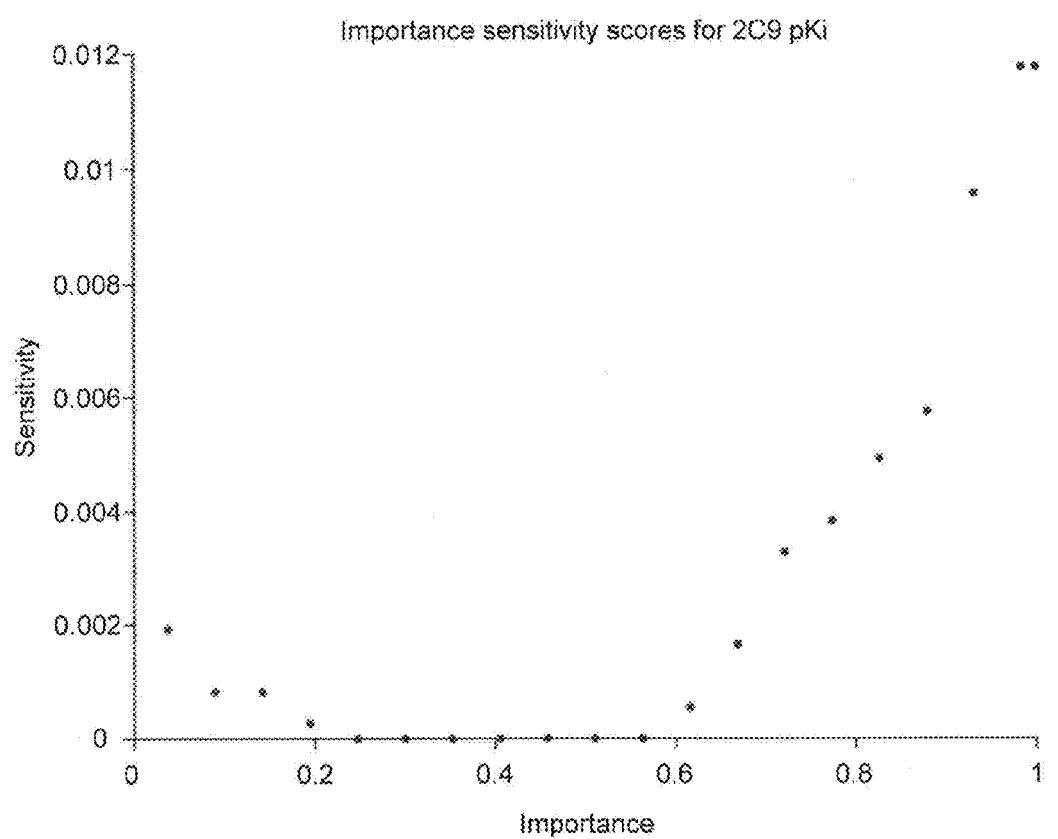
FIG. 8B is an example of the output of the sensitivities with respect to perturbations of a single parameter, namely the importance of the property "2C9 pKi". The unperturbed value of the importance for this property is 0.3 and the importance is constrained to lie within the range 0 to 1 (inclusive). The perturbed importance is shown on the x-axis and the sensitivity due to that importance on the y-axis (the sensitivity is constrained to lie between 0 and 1)

FIG. 8B shows a non-limiting example scatter plot of sensitivity against a perturbation in importance, as defined by the difference between the maximum and minimum of the desirability function $d(x)$, where the maximum value of $d(x)$ is 1. This is an example of a parameter with low sensitivity, as can be seen because the sensitivity increases slowly with the magnitude of the perturbation $\Delta d$.

FIG. 8B is a non-limiting example of the output of the sensitivities with respect to perturbations of a single parameter, namely the importance of the property "2C9 pKi". The unperturbed value of the importance for this property is 0.3 and the importance is constrained to lie within the range 0 to 1 (inclusive). The perturbed importance is shown on the x-axis and the sensitivity due to that importance on the y-axis (as shown, the sensitivity is constrained to lie between 0 and 1).

From an output displaying the sensitivities due to individual perturbations of a selection criterion or importance value, the user can identify the range of a parameter of a selection profile over which the scores, ranks or selection of items in the data set can be not sensitive. If the user is confident that the best value of this parameter lies within the range over which the scores, ranks or selection of items in the data set can be not sensitive to the perturbation, this demonstrates that the prioritisation of items can not change in a statistically significant manner for changes to the parameter within that range and the user does not need to further consider the most appropriate value of the parameter before proceeding with a selection or prioritisation of items.

Figure 9:
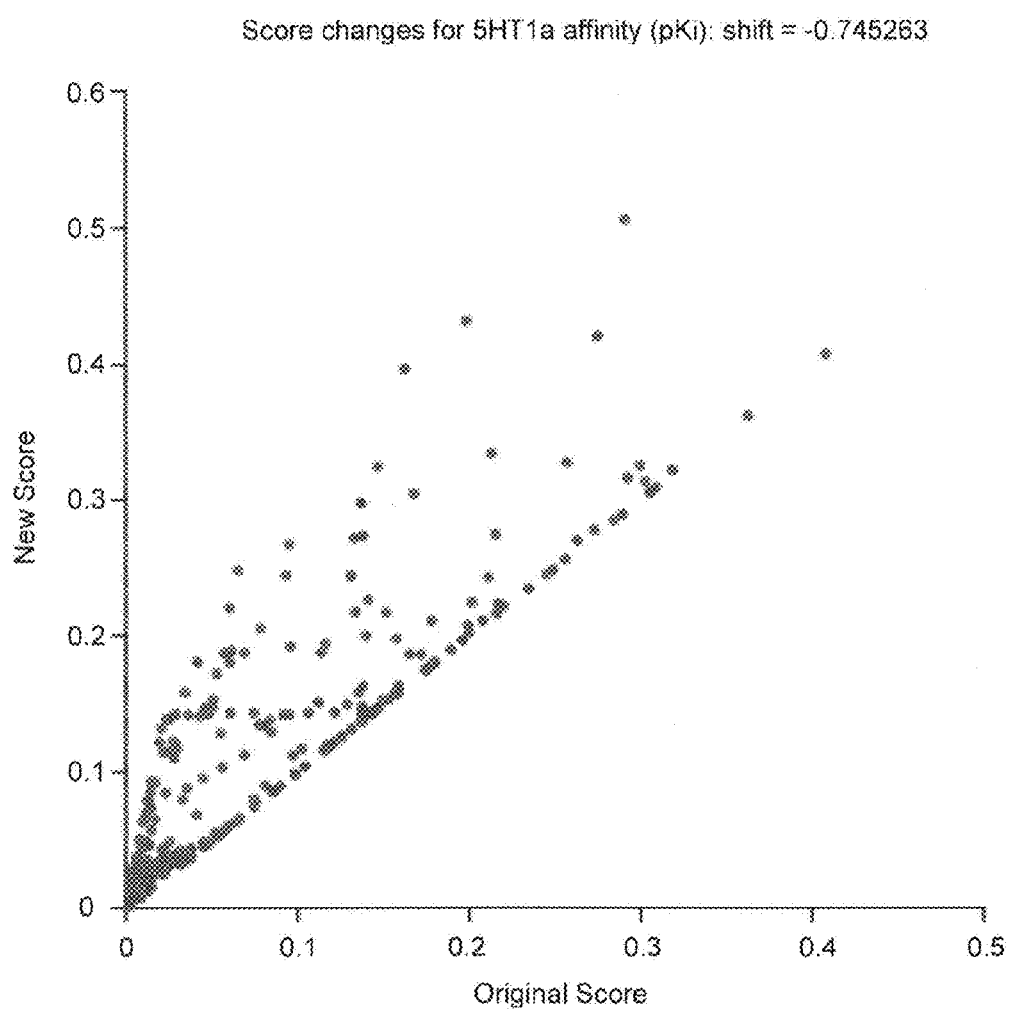
FIG. 9 is an example of a plot of the new versus original scores for a perturbation to the parameter of a selection profile of a rigid shift $\Delta x$ of $-0.745263$ to the desirability function for the property "5HT1a affinity (pKi)".

Step 218 is an optional step in which the correlations between the new and original scores are displayed for one or more perturbations of one or more parameters of the selection profile. In Step 218, the computer can provide output of the impact of one or more individual perturbations to one or more parameters on the scores of the items in the data set. In an embodiment, a scatter plot of the new scores against the original scores is plotted for a perturbation of a parameter of the selection profile, as illustrated in FIG. 9. Other example embodiments include, but can be not limited to output of numerical values of the old and new scores or ranks for each item, a numerical value of the change in score or rank for each item or a display representing the change of score or rank for each item as a colour.

FIG. 9 is an example of a plot of the new versus original scores for a perturbation to the parameter of a selection profile of a rigid shift $\Delta x$ of $-0.745263$ to the desirability function for the property "5HT1a affinity (pKi)".

From an output displaying the correlation between original scores and new scores resulting from a perturbation of a selection criterion or importance value, the user can identify individual items for which the priority changes significantly for a given perturbation or a parameter of a selection profile. An output displaying the correlation between original scores and new scores resulting from a perturbation of a selection criterion or importance value can highlight items that should be considered carefully before deciding to select or reject the item, reducing missed opportunities for good investments of resources, time or capital due to inappropriate rejection of items or wasted resources, time or capital due to the selection of items using inappropriate property selection criteria or importance values.

All of the disclosure regarding the embodiments herein is to be broadly construed and can be made, used, as software and hardware products implemented and executed by electronic means, computer means, as computer readable program code means (use herein synonymously with "program executable code", "computer code", "software code", or "code"), software, by electronic processing and electronic calculations. The methods disclosed herein are numerical in nature and can be implemented for use and execution in an electronic computing environment, such as by use of processing unit, central processing unit, computer, distributed processing and/or computing system, wireless device, laptop, handheld device, cloud-based processing and any electronic architecture adapted to process the calculations and method disclosed herein.

All of the embodiments herein can be made, used, implemented and executed by computer readable program code means. There is no limitation as to the type and nature of computer readable program code means which can be used to achieve the methods and calculations disclosed herein. The software products are not limited and can broadly be any software and or application product capable of processing the numerical methods and calculations disclosed herein. The software products can be applications, subroutines, mobile applications, smartphone applications, wireless applications, cloud-based applications, cloud-based services, or any by computer readable program code means adapted to achieve the methods disclosed herein. There is no limitation on the nature of the product whether the application is source code, compiled code, non-compiled code, downloaded code, compressed code, executable code. This disclosure expressly encompasses any product which provides the method herein to a use and which can provide to, implement, execute, support or enable a user to practice, make or use any method disclosed herein in any embodiment or part thereof.

All of the embodiments herein are transformative in nature. The disclosed numerical methods are to be executed by a computer to transform data regarding at least one item with at least one property value and an at least one uncertainty value by electronic and/or computer means to achieve an output which can be perceived and utilized by a user of the methods disclosed herein.

This scope disclosure is to be broadly construed. It is intended that this disclosure disclose equivalents, means, systems and methods to achieve the computations, software, functions, devices, activities, electronics, computers, systems and mechanical actions disclosed herein. For each functionality, software, method, computation, or executable program code disclosed, it is intended that this disclosure also encompass in its disclosure and teaches equivalents, means, systems and methods for practicing the many aspects of the methods, means, apparatus and articles disclosed herein. Additionally, this disclosure regards numerical methods, software and products related thereto and its many aspects, features and elements. Such a technology can be dynamic in its use an operation, this disclosure is intended to encompass the equivalents, means, systems and methods of the use of the disclosed technology and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. A method executed on a computer for an analysis of data, comprising the steps of:
    providing a computer having a memory and a processing unit adapted to run computer readable program code means;
    providing to said memory an original selection profile comprising an at least one selection criteria for an at least one property;
    each respective item of a plurality of items comprises said at least one property; providing to said memory a data from a data set comprising said plurality of items, said data having at least one property value of said at least one property for at least one item of said plurality of items and an at least one uncertainty value for said at least one property value of at least one item of said plurality of items;
    each respective item of said plurality of items comprises at least one score;
    each of said at least one score comprises an uncertainty;
    said computer running a computer readable program code means processing said original selection profile and processing said data and calculating an original score for each respective item of said plurality of items and an original uncertainty in each original score;
    said computer processing a criterion of said selection criteria of said original selection profile:
        a. said computer executing a computer readable program code means calculating a sensitivity of said criterion resulting from a perturbation of said criterion by executing the steps of:
            i. running a computer readable program code means to generate a new selection profile resulting from a perturbation of said criterion in said original selection profile;
            ii. running a computer readable program code means processing said new selection profile and processing said data and calculating a new score for each respective item of said plurality of items using said new selection profile and a new uncertainty in each new score using said new selection profile;
            iii. running a computer readable program code means processing said original scores and new scores for said plurality of items and processing the original uncertainties in the original scores and new uncertainties in the new scores, calculating a sensitivity value for said perturbation to said criterion using said original scores, uncertainties in said original scores, new scores and uncertainties in said new scores;
        b. said computer running a computer readable program code means repeating steps (i), (ii) and (iii) for one or a plurality of said perturbation of said criterion;
        c. said computer running a computer readable program code means to calculate a sensitivity value for said criterion;
    said computer running a computer readable program code means repeating steps (a), (b) and (c) for at least a second criterion in said selection profile different from said criterion;
    said computer providing an output comprising at least one of said sensitivity value for said criterion or said sensitivity value for said second criterion.

2. Method of claim 1, in which the original selection profile is a multi-dimensional desirability function.

3. The method of claim 1, in which the step of providing to said memory an original selection profile, further comprises providing an importance value for at least one selection criteria in said original scoring profile and further comprising the steps:
    said computer processing an importance value of a criterion of said selection criteria in said original selection profile:
        d. said computer executing a computer readable program code means calculating a sensitivity of said importance value of said criterion resulting from a perturbation of said importance value of said criterion by executing the steps of:
            iv. running a computer readable program code means to generate a new selection profile resulting from a perturbation of said importance value of said criterion in said original selection profile;
            v. running a computer readable program code means processing said new selection profile and processing said data and calculating a new score for each respective item of said plurality of items using said new selection profile and a new uncertainty in each new score using said new selection profile;

vi. running a computer readable program code means processing said original scores and new scores for said plurality of items and processing the original uncertainties in the original scores and the new uncertainties in the new scores, calculating a sensitivity value for said perturbation to said importance value of said criterion using said original scores, uncertainties in said original scores, new scores and uncertainties in said new scores;

e. said computer running a computer readable program code means repeating steps (iv), (v) and (vi) for one or a plurality of said perturbation of said importance value;

f. said computer running a computer readable program code means to calculate a sensitivity value for said importance value;

said computer running a computer readable program code means repeating steps (d), (e) and (f) for at least a second importance value in said selection profile different from said importance value;

said computer providing an output comprising at least one of said sensitivity value for said importance value, or said sensitivity value for said second importance value.

4. The method of claim 3, in which the original selection profile is a multi-dimensional desirability function.

5. The method of claim 2, in which the original selection profile is a multi-dimensional desirability function comprising:

$$D(x_1, x_2, \ldots, x_M \mid d_1(x_1), d_2(x_2), \ldots, d_M(x_M), c_1, c_2, \ldots, c_M) = \sum_{i=1}^{M} c_i d_i(x_i).$$

6. The method of claim 2, in which the original selection profile is a multi-dimensional desirability function comprising:

$$D(x_1, x_2, \ldots, x_M \mid d_1(x_1), d_2(x_2), \ldots, d_M(x_M), c_1, c_2, \ldots, c_M) = \frac{1}{\sum_{i=1}^{M} c_i} \sum_{i=1}^{M} c_i d_i(x_i).$$

7. Method of claim 2, in which the original selection profile is a multi-dimensional desirability function comprising:

$$D(x_1, x_2, \ldots, x_M \mid d_1(x_1), d_2(x_2), \ldots, d_M(x_M), c_1, c_2, \ldots, c_M) = \prod_{i=1}^{M} d_i(x_i)^{c_i}.$$

8. The method of claim 2, in which the original selection profile is a multi-dimensional desirability function comprising:

$$D(x_1, x_2, \ldots, x_M \mid d_1(x_1), d_2(x_2), \ldots, d_M(x_M), c_1, c_2, \ldots, c_M) = \sum_{i=1}^{M} c_i \sqrt{\prod_{i=1}^{M} d_i(x_i)^{c_i}}.$$

9. The method of claim 4, in which the original selection profile is a multi-dimensional desirability function comprising:

$$D(x_1, x_2, \ldots, x_M \mid d_1(x_1), d_2(x_2), \ldots, d_M(x_M), c_1, c_2, \ldots, c_M) = \prod_{i=1}^{M} d_i(x_i)^{c_i}.$$

10. The method of claim 2, further comprising the optional step of receiving an input in the computer memory specifying a proportion of the data set to be selected, K, and in which the sensitivity of said criterion resulting from a perturbation is calculated as $$1 - r(\{s_j\}, \{s'_j\})$$

in which r is the correlation coefficient of the original scores, $s_j$, new scores, $s'_j$, of one or a plurality of K items in the data set.

11. The method of claim 2, further comprising the optional step of receiving an input in the computer memory specifying a proportion of the data set to be selected, K, and in which the sensitivity of said criterion resulting from a perturbation is calculated as $$1 - \rho(\{r_j\}, \{r'_j\})$$

in which $\rho$ is the Spearman's rank correlation coefficient of the original ranks, $r_j$, and new ranks, $r'_j$, of one or a plurality of K items in the data set.

12. The method of claim 2, further comprising the optional step of receiving an input in the computer memory specifying a level of significance and the optional step of receiving an input in the computer memory specifying a proportion of the data set to be selected, K, and in which the sensitivity of said criterion resulting from a perturbation is calculated as $$1 - \rho(\{r_j\}, \{r'_j\})$$

in which $\rho$ is the Spearman's rank correlation coefficient, modified to reflect when the perturbation results in a statistically significant change in the item scores, of the original ranks, $r_j$, and new ranks, $r'_j$, of one or a plurality of K items in the data set.

13. Method of claim 4, further comprising the optional step of receiving an input in the computer memory specifying a level of significance and the optional step of receiving an input in the computer memory specifying a proportion of the data set to be selected, K, and in which the sensitivity of said criterion resulting from a perturbation is calculated as $$1 - \rho(\{r_j\}, \{r'_j\})$$

in which $\rho$ is the Spearman's rank correlation coefficient, modified to reflect when the perturbation results in a statistically significant change in the item scores, of the original ranks, $r_j$, and new ranks, $r'_j$, of one or a plurality of K items in the data set.

14. The method of claim 2, in which the original scores and new scores for said plurality of items are calculated by processing the expected value of the multi-dimensional desirability function.

15. The method of claim 2, in which the probability distribution for the original score and new score for said item can be assumed to be normally distributed with a mean resulting from processing the expected value of the multi-dimensional desirability function and variance resulting from processing the variance of the multi-dimensional desirability function.

16. The method of claim 4, in which the probability distribution for the original score and new score for said item can be assumed to be normally distributed with mean resulting from processing the expected value of the multi-dimensional desirability function and variance resulting from processing the variance of the multi-dimensional desirability function.

17. The method of claim 2, in which in step (a) the perturbation to said criterion of said property in said selection profile is a rigid shift, $\Delta x_k$, of the desirability function of said criterion for said property and the new selection profile is the multi-dimensional desirability function $$D(x_1, x_2, \ldots, x_M | d_1(x_1), d_2(x_2), \ldots d_k(x_k + \Delta x_k), \ldots, d_M(x_M), c_1, c_2, \ldots, c_M)$$

in which D is the multi-dimensional desirability function defining to the original selection profile.

18. The method of claim 4, in which in step (a) the perturbation to said criterion of said property in said selection profile is a rigid shift, $\Delta x_k$, of the desirability function of said criterion for said property and the new selection profile is the multi-dimensional desirability function $$D(x_1, x_2, \ldots, x_M | d_1(x_1), d_2(x_2), \ldots d_k(x_k + \Delta x_k), \ldots, d_M(x_M), c_1, c_2, \ldots, c_M)$$

in which D is the multi-dimensional desirability function defining to the original selection profile.

19. The method of claim 4, in which in step (d) said perturbation of said importance value of said criterion is a shift in importance, $\Delta c_k$, in a coefficient defining the importance of said criterion for said property and the new selection profile is a multi-dimensional desirability function of the form $$D(x_{1j}, x_{2j}, \ldots, x_M | d_1(x_1), d_2(x_2), \ldots, d_M(x_M), c_1, c_2, \ldots, c_k + \Delta c_k, \ldots, c_M)$$

in which D is the multi-dimensional desirability function defining the original selection profile.

20. The method of claim 4, in which in step (d) said perturbation of said importance value of said criterion is a perturbation, $\Delta d_k$, of the desirability function of said criterion for said property and the new selection profile is a multi-dimensional desirability function comprising:

$$D(x_{1j}, x_{2j}, \ldots, x_M | d_1(x_1), d_2(x_2), \ldots, d'_k(x_k), \ldots, d_M(x_M))$$

in which D is the multi-dimensional desirability function defining the original selection profile and $$d'_k(x_k) = (d_k(x_k) - \min(d_k(x))) \left(1 - \frac{\Delta d_k}{\max(d_k(x)) - \min(d_k(x))}\right) + \Delta d_k + \min(d_k(x)).$$

21. A computer program product for an analysis of data, comprising:
   a computer readable program code means which provides to a computer memory an original selection profile comprising an at least one selection criteria for an at least one property;
   each respective item of a plurality of items comprises said at least one property;
   a computer readable program code means which provides to said memory a data from a data set comprising said plurality of items, said data having at least one property value of said at least one property for at least one item of said plurality of items and an at least one uncertainty value for said at least one property value of at least one item of said plurality of items;
   each respective item of said plurality of items comprises at least one score, and in which each of said at least one score comprises an uncertainty;
   a computer readable program code means which processes said original selection profile and processes said data set and is adapted to calculate an original score for each respective item of said plurality of items and an original uncertainty in each original score;
   a computer readable program code means which processes a criterion of said selection criteria of said original selection profile:
      a. a computer readable program code means which calculates a sensitivity of said criterion resulting from a perturbation of said criterion which comprises:
         i. a computer readable program code means which generates a new selection profile resulting from a perturbation of said criterion in said original selection profile;
         ii. a computer readable program code means which processes said new selection profile and processes said data set and which is adapted to calculate a new score for each respective item of said plurality of items using said new selection profile and a new uncertainty in each new score using said new selection profile;
         iii. a computer readable program code means which processes said original scores and new scores for said plurality of items and processes the original uncertainties in the original scores and new uncertainties in the new scores and is adapted to calculate a sensitivity value for said perturbation to said criterion using said original scores, uncertainties in said original scores, new scores and uncertainties in said new scores;
      b. a computer readable program code means which is adapted to execute the computer readable program code means (i), (ii) and (iii) for one or a plurality of said perturbation of said criterion;
      c. a computer readable program code means which is adapted to calculate a sensitivity value for said criterion;
   a computer readable program code means adapted to execute the computer readable program code means (a), (b) and (c) for at least a second criterion in said selection profile different from said criterion;
   a computer readable program code means adapted to provide an output comprising at least one of said sensitivity value for said criterion or said sensitivity value for said second criterion.

22. The computer program product of claim 21, in which the original selection profile is a multi-dimensional desirability function.

23. The computer program product of claim 21, further comprising:
   a computer readable program code means which provides an importance value for at least one selection criteria in said original scoring profile;
   a computer readable program code means adapted to process said importance value of a criterion of said selection criteria in said original selection profile:

d. a computer readable program code means which calculates a sensitivity of said importance value of said criterion resulting from a perturbation of said importance value of said criterion by executing the steps of:
  iv. a computer readable program code means which can generate a new selection profile resulting from a perturbation of said importance value of said criterion in said original selection profile;
  v. a computer readable program code means which can process said new selection profile and which is adapted to process said data set and to calculate a new score for each respective item of said plurality of items using said new selection profile and to calculate a new uncertainty in each new score using said new selection profile;
  vi. a computer readable program code means which can process said original scores and said new scores for said plurality of items and which is adapted to process the original uncertainties in the original scores and to process the new uncertainties in the new scores to calculate a sensitivity value for said perturbation to said importance value of said criterion using said original scores, uncertainties in said original scores, new scores and uncertainties in said new scores;
e. a computer readable program code means adapted to execute the computer readable program code means of (iv), (v) and (vi) for one or a plurality of said perturbation of said importance value;
f. a computer readable program code means which is adapted to calculate a sensitivity value for said importance value;
a computer readable program code means which is adapted to repeat the calculations of (d), (e) and (f) for at least a second importance value in said selection profile different from said importance value;
a computer readable program code means which is adapted to provide an output comprising at least one of said sensitivity value for said importance value, or said sensitivity value for said second importance value.

24. The computer program product of claim 23, in which the original selection profile is a multi-dimensional desirability function.

25. The computer program product of claim 22, in which the selection profile is a multi-dimensional desirability function comprising:

$$D(x_1, x_2, \ldots, x_M \mid d_1(x_1), d_2(x_2), \ldots, d_M(x_M), c_1, c_2, \ldots, c_M) = \prod_{i=1}^{M} d_i(x_i)^{c_i}.$$

26. The computer program product of claim 24, in which the selection profile is a multi-dimensional desirability function comprising:

$$D(x_1, x_2, \ldots, x_M \mid d_1(x_1), d_2(x_2), \ldots, d_M(x_M), c_1, c_2, \ldots, c_M) = \prod_{i=1}^{M} d_i(x_i)^{c_i}.$$

27. The computer program product of claim 22, further adapted to receive an input in the computer memory specifying a level of significance and to receive an input in the computer memory which specifies a proportion of the data set to be selected, K, and in which the sensitivity of said criterion resulting from a perturbation is calculated as $$1-\rho(\{r_j\},\{r'_j\})$$

in which $\rho$ is the Spearman's rank correlation coefficient, modified to reflect when the perturbation results in a statistically significant change in the item scores, of the original ranks, $r_j$, and new ranks, $r'_j$, of one or a plurality of K items in the data set; in which K has a value in a range of from 1 to the total number of items in the data set.

28. The computer program product of claim 24, further adapted to receive an input in the computer memory specifying a level of significance and to receive an input in the computer memory specifying a proportion of the data set to be selected, K, and in which the sensitivity of said criterion resulting from a perturbation is calculated as $$1-\rho(\{r_j\},\{r'_j\})$$

in which $\rho$ is the Spearman's rank correlation coefficient, modified to reflect when the perturbation results in a statistically significant change in the item scores, of the original ranks, $r_j$, and new ranks, $r'_j$, of one or a plurality of K items in the data set; in which K has a value from 1 to the total number of items in the data set.

29. The computer program product of claim 22, in which the probability distribution for the original score and new score for said item can be assumed to be normally distributed with a mean resulting from processing the expected value of the multi-dimensional desirability function and variance resulting from processing the variance of the multi-dimensional desirability function.

30. The computer program product of claim 24, in which the probability distribution for the original score and new score for said one or a plurality of said item can be assumed to be normally distributed with a mean resulting from processing the expected value of the multi-dimensional desirability function and variance resulting from processing the variance of the multi-dimensional desirability function.

31. The computer program product of claim 22, in which the calculation (a) the perturbation to said criterion of said property in said selection profile is a rigid shift, $\Delta x_k$, of the desirability function of said criterion for said property and the new selection profile is the multi-dimensional desirability function $$D(x_1, x_2, \ldots, x_M \mid d_1(x_1), d_2(x_2), \ldots, d_k(x_k+\Delta x_k), \ldots, d_M(x_M), c_1, c_2, \ldots, c_M)$$

in which D is the multi-dimensional desirability function which defines the original selection profile.

32. The computer program product of claim 24, in which in the calculation (d) said perturbation of said importance value of said criterion is a shift in importance, $\Delta c_k$, a coefficient defining the importance of said criterion for said property and the new selection profile is a multi-dimensional desirability function comprising $$D(x_{1j}, x_{2j}, \ldots, x_M \mid d_1(x_1), d_2(x_2), \ldots, d_M(x_M), c_1, c_2, \ldots, c_k+\Delta c_k, \ldots, c_M)$$

in which D is the multi-dimensional desirability function defining the original selection profile.

33. The computer program product of claim 24, in which in the calculation (d) said perturbation of said importance value of said criterion is a perturbation, $\Delta d_k$, of the desirability function of said criterion for said property and the new selection profile is a multi-dimensional desirability function comprising:

$$D(x_{1j}, x_{2j}, \ldots, x_M \mid d_1(x_1), d_2(x_2), \ldots, d'_k(x_k), \ldots, d_M(x_M))$$

in which D is the multi-dimensional desirability function which defines the original selection profile and $$d'_k(x_k) = (d_k(x_k) - \min(d_k(x)))\left(1 - \frac{\Delta d_k}{\max(d_k(x)) - \min(d_k(x))}\right) + \Delta d_k + \min(d_k(x)).$$

34. A method executed on a computer for an analysis of data, comprising the steps of:
providing a computer having a memory and a processing unit adapted to run computer readable program code means;
providing to said memory an original selection profile comprising an at least one selection criteria for an at least one property;
each respective compound of a plurality of compounds comprises said at least one property;
providing to said memory a data from a data set comprising said plurality of compounds, said data having at least one property value of said at least one property for at least one compound of said plurality of compounds and an at least one uncertainty value for said at least one property value of at least one compound of said plurality of compounds;
each respective compound of said plurality of compounds comprises at least one score;
each of said at least one score comprises an uncertainty;
said computer running a computer readable program code means processing said original selection profile and processing said data and calculating an original score for each respective compound of said plurality of compounds and an original uncertainty in each original score;
said computer processing a criterion of said selection criteria of said original selection profile:
A. said computer executing a computer readable program code means calculating a sensitivity of said criterion resulting from a perturbation of said criterion by executing the steps of:
I. running a computer readable program code means to generate a new selection profile resulting from a perturbation of said criterion in said original selection profile;
II. running a computer readable program code means processing said new selection profile and processing said data and calculating a new score for each respective compound of said plurality of compounds using said new selection profile and a new uncertainty in each new score using said new selection profile;
III. running a computer readable program code means processing said original scores and new scores for said plurality of compounds and processing the original uncertainties in the original scores and new uncertainties in the new scores, calculating a sensitivity value for said perturbation to said criterion using said original scores, uncertainties in said original scores, new scores and uncertainties in said new scores;
B. said computer running a computer readable program code means repeating steps (I), (II) and (III) for one or a plurality of said perturbation of said criterion;
C. said computer running a computer readable program code means to calculate a sensitivity value for said criterion;
said computer running a computer readable program code means repeating steps (A), (B) and (C) for at least a second criterion in said selection profile different from said criterion;
said computer providing an output comprising at least one of said sensitivity value for said criterion or said sensitivity value for said second criterion.

35. The method of claim 34, in which the step of providing to said memory an original selection profile, further comprises providing an importance value for at least one selection criteria in said original scoring profile and further comprising the steps:
said computer processing an importance value of a criterion of said selection criteria in said original selection profile:
D. said computer executing a computer readable program code means calculating a sensitivity of said importance value of said criterion resulting from a perturbation of said importance value of said criterion by executing the steps of:
IV. running a computer readable program code means to generate a new selection profile resulting from a perturbation of said importance value of said criterion in said original selection profile;
V. running a computer readable program code means processing said new selection profile and processing said data and calculating a new score for each respective item of said plurality of compounds using said new selection profile and a new uncertainty in each new score using said new selection profile;
VI. running a computer readable program code means processing said original scores and new scores for said plurality of compounds and processing the original uncertainties in the original scores and new uncertainties in the new scores, calculating a sensitivity value for said perturbation to said importance value of said criterion using said original scores, uncertainties in said original scores, new scores and uncertainties in said new scores;
E. said computer running a computer readable program code means repeating steps (IV), (V) and (VI) for one or a plurality of said perturbation of said importance value;
F. said computer running a computer readable program code means to calculate a sensitivity value for said importance value;
said computer running a computer readable program code means repeating steps (D), (E) and (F) for at least a second importance value in said selection profile different from said importance value;
said computer providing an output comprising at least one of said sensitivity value for said importance value, or said sensitivity value for said second importance value.

36. The method of claim 1, wherein said plurality of items is a plurality of compounds.

37. The method of claim 1, wherein said plurality of items is a plurality of candidate drugs.

38. The method of claim 3, wherein said importance value is an importance value for a criterion of a property of a compound.

39. The computer program product of claim 21, wherein said item is a compound.

40. The computer program product of claim 21, wherein said item is a candidate drug.

41. The computer program product of claim 23, wherein said importance value is an importance value for a criterion of a compound.

42. The method of claim 34, wherein said plurality of items is a plurality of organic compounds.

43. The method of claim 34, wherein said plurality of items is a plurality of candidate drugs.

44. The method of claim 34, wherein said uncertainty value is an uncertainty value for a property of a candidate drug.

* * * * *